United States Patent
Cohoon et al.

(10) Patent No.: US 7,923,506 B2
(45) Date of Patent: Apr. 12, 2011

(54) MOLDING COMPOSITIONS CONTAINING MODIFIED POLYBUTYLENE TEREPHTHALATE (PBT) RANDOM COPOLYMERS DERIVED FROM POLYETHYLENE TEREPHTHALATE (PET)

(75) Inventors: Kristen Cohoon, Lutz, FL (US); Shellie Virginia Gasaway, Los Angeles, CA (US); Ganesh Kannan, Evansville, IN (US); Kenneth Frederick Miller, Posey, IN (US); Kayoko Onda, Tochigi (JP); Dhaval Shah, Evansville, IN (US)

(73) Assignee: Sabic Innovative Plastics IP B.V. (NL)

( * ) Notice: Subject to any disclaimer, the term of this patent is extended or adjusted under 35 U.S.C. 154(b) by 191 days.

(21) Appl. No.: 11/626,105

(22) Filed: Jan. 23, 2007

(65) Prior Publication Data

US 2007/0278462 A1 Dec. 6, 2007

Related U.S. Application Data

(60) Provisional application No. 60/820,465, filed on Jul. 26, 2006, provisional application No. 60/763,109, filed on Jan. 27, 2006.

(51) Int. Cl.
*C08L 67/03* (2006.01)

(52) U.S. Cl. ............ 524/605; 524/92; 524/94; 524/195; 521/48; 521/48.5; 525/439; 528/272

(58) Field of Classification Search .................. 524/92, 524/94, 195; 521/48, 48.5; 525/439; 528/272
See application file for complete search history.

(56) References Cited

U.S. PATENT DOCUMENTS

| | | | |
|---|---|---|---|
| 2,465,319 A | 3/1949 | Whinfield et al. | |
| 2,720,502 A | 10/1955 | Caldwell | |
| 2,727,881 A | 12/1955 | Caldwell et al. | |
| 2,822,348 A | 2/1958 | Haslam | |
| 3,047,539 A | 7/1962 | Pengilly | |
| 3,193,523 A * | 7/1965 | Neumann et al. ................. | 560/2 |
| 3,224,043 A | 12/1965 | Lameris et al. | |
| 3,302,243 A | 2/1967 | Ludwig | |
| 3,671,487 A | 6/1972 | Abolins | |
| 3,701,755 A | 10/1972 | Sumoto et al. | |
| 3,864,428 A | 2/1975 | Nakamura et al. | |
| 3,907,868 A | 9/1975 | Currie et al. | |
| 3,907,926 A | 9/1975 | Brown et al. | |
| 3,915,608 A | 10/1975 | Hujik | |
| 3,953,394 A | 4/1976 | Fox et al. | |
| 4,096,156 A | 6/1978 | Freudenberger et al. | |
| 4,128,526 A | 12/1978 | Borman | |
| 4,154,775 A | 5/1979 | Axelrod | |
| 4,200,567 A | 4/1980 | Goldman et al. | |
| 4,203,887 A | 5/1980 | Goedde et al. | |
| 4,264,487 A | 4/1981 | Fromuth et al. | |
| 4,337,192 A | 6/1982 | Campbell | |
| 4,355,155 A | 10/1982 | Nelsen | |
| 4,469,851 A | 9/1984 | Charles et al. | |
| 4,579,884 A | 4/1986 | Liu | |
| 4,598,117 A | 7/1986 | Liu et al. | |
| 4,609,680 A | 9/1986 | Fujita et al. | |
| 4,657,988 A * | 4/1987 | Sugerman et al. ............ | 525/437 |
| 4,954,540 A | 9/1990 | Nakane et al. | |
| 5,122,551 A | 6/1992 | Gallucci et al. | |
| 5,221,704 A | 6/1993 | Shimotsuma et al. | |
| 5,266,601 A | 11/1993 | Kyber et al. | |
| 5,326,806 A | 7/1994 | Yokoshima et al. | |
| 5,413,681 A | 5/1995 | Tustin et al. | |
| 5,451,611 A | 9/1995 | Chilukuri et al. | |
| 5,559,159 A | 9/1996 | Sublett et al. | |
| 5,804,654 A | 9/1998 | Lo et al. | |
| 6,020,414 A | 2/2000 | Nelsen et al. | |
| 6,162,837 A | 12/2000 | Gerking et al. | |
| 6,255,371 B1 | 7/2001 | Schlosser et al. | |
| 6,384,129 B1 | 5/2002 | Lowry | |
| 6,406,081 B1 | 6/2002 | Mahfet et al. | |
| 6,476,158 B1 | 11/2002 | England et al. | |
| 6,515,044 B1 | 2/2003 | Idel et al. | |
| 6,518,322 B1 * | 2/2003 | West ........................ | 521/48.5 |
| 6,579,943 B1 | 6/2003 | Ishino et al. | |
| 6,706,843 B1 | 3/2004 | Ishihara et al. | |
| 6,887,909 B2 | 5/2005 | Kawamura et al. | |

(Continued)

FOREIGN PATENT DOCUMENTS

EP 0400936 A1 12/1990

(Continued)

OTHER PUBLICATIONS

Hale, W. et al.: "Compatibilization of PBT/ABS Blends by Methyl Methacrylate-Glycidyl Methacrylate-Ethyl Acrylate Terpolymers". Polymer, Elsevier Science Publishers B.V. GB, vol. 40, No. 2, Jan. 1999, pp. 365-377.

PCT International Search Report for International Application No. PCT/US2007/001974.

W. Hale et al., "Compatibilization of PBT/ABS blends by methyl methacrylate-glycidyl methacrylate-ethyl acrylate terpolymers," Polymer 40, 1999, pp. 365-377, Elsevier Science Ltd.

(Continued)

*Primary Examiner* — Peter Szekely
(74) *Attorney, Agent, or Firm* — Cantor Colburn LLP; Diderico van Eyl

(57) ABSTRACT

A molding composition comprising:

(a) from 40 to 99.99 wt % of a modified polybutylene terephthalate random copolymer that (1) is derived from polyethylene terephthalate component selected from the group consisting of polyethylene terephthalate and polyethylene terephthalate copolymers and (2) has at least one residue derived from the polyethylene terephthalate component, and (b) from 0.01 to 20 wt. % of a carboxy reactive component;

wherein the modified polybutylene terephthalate random copolymer, the carboxy reactive component, and optionally at least one additive, are present in a total amount of 100 wt %.

56 Claims, No Drawings

U.S. PATENT DOCUMENTS

| | | | |
|---|---|---|---|
| 6,927,275 | B2 | 8/2005 | Hirokane et al. |
| 7,179,869 | B2 | 2/2007 | Hirokane et al. |
| 7,183,362 | B2 | 2/2007 | Hirokane et al. |
| 7,388,067 | B2 * | 6/2008 | Leemans et al. ............ 528/301 |
| 7,462,649 | B2 | 12/2008 | Nakao et al. |
| 2002/0012807 | A1 | 1/2002 | Kurian et al. |
| 2002/0188073 | A1 | 12/2002 | Uno et al. |
| 2007/0244242 | A1 | 10/2007 | Agarwal et al. |
| 2007/0275242 | A1 | 11/2007 | Gopal et al. |
| 2008/0169590 | A1 | 7/2008 | Mehta et al. |

FOREIGN PATENT DOCUMENTS

| | | |
|---|---|---|
| EP | 0682080 A1 | 11/1995 |
| EP | 0683201 A1 | 11/1995 |
| GB | 1500577 | 2/1978 |
| GB | 2098231 A | 11/1982 |
| JP | 1174557 A | 7/1989 |
| JP | 4345655 A | 12/1992 |
| JP | 2000-256472 A | 9/2000 |
| JP | 2000-256920 A | 9/2000 |
| JP | 2001031851 A | 2/2001 |
| JP | 2005-89572 A | 4/2005 |
| KR | 2001-0083551 A | 9/2001 |
| WO | 99/65987 A1 | 12/1999 |
| WO | WO03/066704 | 8/2003 |

OTHER PUBLICATIONS

S.H. Mansour et al., "Depolymerization of Poly(ethylene terephthalate) Waste Using 1, 4-Butanediol and Triethylene Glycol," Journal of Elastomers and Plastics; Apr. 2003, pp. 133-147, vol. 35, Sage Publications.

Chemical Processing, [online]; [retrieved on Oct. 14, 2009]; retrieved from the Internet http://www.chemicalprocessing.com/industrynews/2006/056.html Article: "GE gives plastic bottle recycling a new spin," Chemical Processing.com, Aug. 26, 2006, 2pgs.

A. Pawlak et al., "Characterization of scrap poly(ethylene terephthalate)," European Polymer Journal, 2000, pp. 1875-1884, vol. 36, Elsevier Science Ltd.

* cited by examiner

MOLDING COMPOSITIONS CONTAINING MODIFIED POLYBUTYLENE TEREPHTHALATE (PBT) RANDOM COPOLYMERS DERIVED FROM POLYETHYLENE TEREPHTHALATE (PET)

CROSS REFERENCE TO RELATED APPLICATIONS

This application claims priority to U.S. Provisional Application Ser. Nos. 60/763,109 filed on Jan. 27, 2006 and 60/820,465 filed Jul. 26, 2006, which are incorporated herein by reference in their entirety.

BACKGROUND OF THE INVENTION

Polyethylene terephthalate (also referred to as "PET") is a polyester of terephthalic acid and ethylene glycol and can be obtained by the polycondensation of dimethyl terephthalate with ethylene glycol, and also terephthalic acid with ethylene glycol or ethylene oxide. PET exists both as an amorphous (transparent) and as a semi-crystalline (opaque and white) thermoplastic material. Generally, it has useful chemical resistance to mineral oils, solvents and acids but not to bases. Semi-crystalline PET has good strength, ductility, stiffness and hardness. Amorphous PET has better ductility but less stiffness and hardness. PET is used to make bottles for soft drinks and other household and consumer products. Unfortunately, despite recycling efforts, billions of pounds of PET are still dumped into landfills annually all over the world. Other PET that is not reused is incinerated. The substantial amount of PET that is disposed into landfills creates significant waste. The incineration of PET requires significant resources that could be used more effectively.

Thermoplastic molding compositions based on polybutylene terephthalate (also referred to as "PBT") and epoxies are used in various applications. Although conventional PBT-epoxy molding compositions are useful to many customers, ordinary PBT-epoxy molding compositions generally cannot be made from recycle sources of PBT due to the lack of availability. PET, unlike PBT, is made in much larger quantities and is partially recovered from consumer wastes. If PET (scrap) materials could be converted to PBT and converted into useful molding compositions, then there would exist a valuable way to meet the unmet need to effectively use underutilized scrap PET in PBT thermoplastic molding compositions.

BRIEF DESCRIPTION OF THE INVENTION

The invention relates to a molding composition comprising
(a) from 40 to 99.99 wt % of a modified polybutylene terephthalate random copolymer that (1) is derived from polyethylene terephthalate component selected from the group consisting of polyethylene terephthalate and polyethylene terephthalate copolymers and (2) has at least one residue derived from the polyethylene terephthalate component, and
  (b) from 0.01 to 20 wt. % of a carboxy reactive component;
  (c) from 0 to 25 wt % of an impact modifier;
  (d) from 0 to 1 wt % of a ultraviolet stabilizer;
  (e) from 0 to 30 wt % of a flame retarding component; and
  (f) from 0 to 1 wt % of a mold release
wherein the modified polybutylene terephthalate random copolymer, the carboxy reactive component, the ultraviolet stabilizer, the flame retarding component, the mold release, and optionally at least one additive, are present in a total amount of 100 wt %.

In another embodiment, the invention relates to a molding composition comprising:
  (a) from 70 to 99.99 wt % of a modified polybutylene terephthalate random copolymer that (1) is derived from polyethylene terephthalate component selected from the group consisting of polyethylene terephthalate and polyethylene terephthalate copolymers and (2) has at least one residue derived from the polyethylene terephthalate component, and
  (b) from 0.01 to 20 wt. % of a carboxy reactive component;
  (c) from 0 to 25 wt % of an impact modifier;
  (d) from 0 to 1 wt % of a ultraviolet stabilizer;
  (e) from 0 to 30 wt % of a flame retarding component; and
  (f) from 0 to 1 wt % of a mold release
wherein the modified polybutylene terephthalate random copolymer, the carboxy reactive component, the ultraviolet stabilizer, the flame retarding component, the mold release, and optionally at least one additive, are present in a total amount of 100 wt %.

In another embodiment, the invention relates to a molding composition comprising:
  (a) a first polyester component having an intrinsic viscosity ranging from 0.5 to 1.0 dL/g and comprising: from 20 to 49.9 wt % of a modified polybutylene terephthalate random copolymer that (1) is derived from polyethylene terephthalate component selected from the group consisting of polyethylene terephthalate and polyethylene terephthalate copolymers and (2) at least one residue derived from the polyethylene terephthalate component, and
  (b) a second polyester component having an intrinsic viscosity ranging from 1.1 to 1.4 dL/g and comprising: from 20 to 49.9 wt % of a modified polybutylene terephthalate random copolymer that (1) is derived from polyethylene terephthalate component selected from the group consisting of polyethylene terephthalate and polyethylene terephthalate copolymers and (2) at least one residue derived from the polyethylene terephthalate component, and
  (c) from 0.01 to 20 wt. % of a carboxy reactive component;
wherein the first polyester component, the second polyester component, and optionally at least one additive, are present in a total amount of 100 wt %.

In another embodiment, the invention relates to a composition comprising:
  (a) a first polyester component having an intrinsic viscosity ranging from 0.5 to 1.0 dL/g and comprising: from 20 to 49.9 wt % of a modified polybutylene terephthalate random copolymer that (1) is derived from polyethylene terephthalate component selected from the group consisting of polyethylene terephthalate and polyethylene terephthalate copolymers and (2) has at least one residue derived from the polyethylene terephthalate component, and
  (b) a second polyester component having an intrinsic viscosity ranging from 1.1 to 1.4 dL/g and comprising: from 20 to 49.9 wt % of a modified polybutylene terephthalate random copolymer that (1) is derived from polyethylene terephthalate component selected from the group consisting of polyethylene terephthalate and polyethylene terephthalate copolymers and (2) has at least one residue derived from the polyethylene terephthalate component, and
  (c) from 0.01 to 20 wt. % of a carboxy reactive component;
  (d) from 0.01 to 20 wt. % of a carboxy reactive component;
  (e) from 0 to 25 wt % of an impact modifier;

(f) from 0 to 1 wt % of a ultraviolet stabilizer;

(g) from 0 to 30 wt % of a flame retarding component; and (h) from 0 to 1 wt % of a mold release wherein the first polyester component, the second polyester component, the carboxy reactive component, the impact modifier, the ultraviolet stabilizer, the flame retarding component, the mold release, and optionally, at least one additive, are present in a total amount of 100 wt %;

wherein the composition has a melt volume rate that is at least 10% higher as compared to a composition made with monomer based polybutylene terephthalate homopolymers, as measured on pellets according to ISO 1133 method at 250° C. and 5 kgf at dwelling time of 240 seconds and a 2.1 mm orifice;

wherein the composition has a heat deflection temperature at 0.455 MPa that is greater than 180° C.; and wherein the composition has a total monomer content selected from the group consisting of ethylene glycol, isophthalic acid groups, and diethylene glycol groups in an amount ranging from more than 0 and less than or equal to 17 equivalents of a residue selected from the group of isophthalic acid groups, ethylene glycol groups, and diethylene glycol groups, and combinations thereof, relative to the total of 100 equivalents of diol and 100 equivalents of diacid groups in the modified polybutylene terephthalate random copolymer.

In another embodiment, the invention relates to a method of forming a composition comprising melt blending the components of any composition of the invention.

In another embodiments, the invention relates to methods for making articles from compositions and the articles made from the compositions.

DETAILED DESCRIPTION OF THE INVENTION

The invention is based on the discovery that it is now possible to make a molding composition containing/based on a modified PBT component derived from scrap poly(ethylene terephthalate). Unlike conventional compositions that use "virgin" PBT (PBT that is derived from monomers), the modified PBT component used in the molding compositions additionally contain ethylene glycol and isophthalic acid groups (components that are not present in virgin PBT). Despite using a material that is structurally different from PBT used in known molding compositions, a molding composition of the invention exhibits performance properties that are competitive with molding composition made with virgin PBT.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and m maximum values. Unless expressly indicated otherwise, the various numerical ranges specified in this application are approximations.

All ASTM tests and data are from the 2003 edition of the Annual Book of ASTM Standards unless otherwise indicated.

All molecular weights in this application refer to number average molecular weight obtained with the polystyrene standard. Details of the technique include the following items: (i) Instrument: Waters 2695 separation module; (ii) Detector: Waters 2487 Dual Absorbance Ultraviolet Detector @273 and 295 nanometers and Water 410 refractomer; (iii) Mobile phase: 5% HFIP 95% chloroform; (iv) GPC columns: Polymer Labs PL HFIPgel 250×4.6 mm, (v) Flow rate: 0.3 ml/min; (vi) Injection volume 10 μl; (vii)

Polystyrene standards: Polymer Lab's Easical PS-1, 580-7, 500,000 Da.

For the sake of clarity, the terms terephthalic acid group, isophthalic acid group, butane diol group, ethylene glycol group in formulas have the following meanings. The term "terephthalic acid group" (R') in a composition refers to a divalent 1,4-benzene radical (-1,4-$(C_6H_4)$—) remaining after removal of the carboxylic groups from terephthalic acid-. The term "isophthalic acid group" (R") refers to a divalent 1,3-benzene radical (-(-1,3-$C_6H_4$)—) remaining after removal of the carboxylic groups from isophthalic acid. The "butane diol group" (D) refers to a divalent butylene radical (—$(C_4H_8)$—) remaining after removal of hydroxyl groups from butanediol. The term "ethylene glycol group" (D') refers to a divalent ethylene radical (—$(C_2H_4)$—) remaining after removal of hydroxyl groups from ethylene glycol-). With respect to the terms "isophthalic acid group," "ethylene glycol group," and "diethylene glycol group" being used in other contexts, e.g., to indicate the weight % of the group in a composition, the term "isophthalic acid group(s)" means the group having the formula (—O(CO)$C_6H_4$(CO)—), the term "terephthalic acid group(s)" means the group having the formula (—O(CO)$C_6H_4$(CO)—), the term diethylene glycol group means the group having (—O($C_2H_4$)O($C_2H_4$)—), the term "butane diol group(s)" means the group having the formula (—O$(C_4H_8)$—), and the term "ethylene glycol groups(s)" means the group having formula (—O($C_2H_4$)—).

An embodiment of the invention relates to molding composition comprising:

(a) from 40 to 99.99 wt % of a modified polybutylene terephthalate random copolymer that (1) is derived from polyethylene terephthalate component selected from the group consisting of polyethylene terephthalate and polyethylene terephthalate copolymers and (2) at least one residue derived from the polyethylene terephthalate component, and (b) from 0.01 to 20 wt. % of a carboxy reactive component;

(c) from 0 to 25 wt % of an impact modifier;

(d) from 0 to 1 wt % of a ultraviolet stabilizer;

(e) from 0 to 30 wt % of a flame retarding component; and (f) from 0 to 1 wt % of a mold release wherein the modified polybutylene terephthalate random copolymer, the carboxy reactive component, the ultraviolet stabilizer, the flame retarding component, the mold release, and optionally at least one additive, are present in a total amount of 100 wt %.

The modified polybutylene terephthalate component derived from polyethylene terephthalate (PET-derived modified PBT component) is (1) is derived from polyethylene terephthalate component selected from the group consisting of polyethylene terephthalate and polyethylene terephthalate copolymers and (2) has at least one residue derived from the polyethylene terephthalate component. In one embodiment, the modified polybutylene terephthalate component can further be derived from a biomass-derived 1,4-butanediol, e.g. corn derived 1,4-butanediol or a 1,4-butanediol derived from a cellulosic material.

The residue derived from the polyethylene terephthalate component, which is present in the modified polybutylene terephthalate component can be selected from the group consisting of ethylene glycol groups, diethylene glycol groups, isophthalic acid groups, antimony-containing compounds, germanium-containing compounds, titanium-containing compounds, cobalt-containing compounds, tin containing compounds, aluminum, aluminum salts, 1,3-cyclohexane dimethanol isomers, 1,4-cyclohexane dimethanol isomers, the cis isomer of 1,3-cyclohexane dimethanol, the cis isomer of 1,4-cyclohexane dimethanol, the 1,3-trans isomer of cyclohexane dimethanol, the 1,4-trans isomer of 1,4-cyclohexane dimethanol, alkali salts, alkaline earth metal salts, e.g., calcium, magnesium, sodium and potassium salts, phosphorous-containing compounds and anions, sulfur-containing compounds and anions, napthelane dicarboxylic acids, 1,3-propanediol groups, and combinations thereof.

Depending on factors such as polyethylene terephthalate and polyethylene terephthalate copolymers, the residue can include various combinations. In one embodiment, for instance, the residue includes mixtures of ethylene glycol and diethylene glycol. In another embodiment, the residue includes mixtures of ethylene glycol and diethylene glycol and isophthalic acid. In another embodiment, the residue derived from polyethylene terepthalate further includes cis isomer of 1,3-cyclohexane dimethanol, 1,4-cyclohexane dimethanol, trans isomer of 1,-3 cyclohexane dimethanol, trans isomer of 1,4 cyclohexane dimethanol and combinations thereof. In another embodiment, the residue includes cis isomer of 1,3-cyclohexane dimethanol, 1,4-cyclohexane dimethanol, trans isomer of 1,-3 cyclohexane dimethanol, trans isomer of 1,4 cyclohexane dimethanol and combinations thereof. And in another embodiment, the residue can be a mixture of ethylene glycol, diethylene glycol, isophthalic acid groups, cis isomer of cyclohexane dimethanol, trans isomer of cyclohexane dimethanol, and combinations thereof. In one embodiment, the residue derived from polyethylene terephthalate includes mixtures of ethylene glycol, diethylene glycol, and cobalt-containing compounds. Such cobalt-containing compound mixture can also contain isophthalic acid groups.

In one embodiment, for instance, the modified polybutylene terephthalate component derived from polyethylene terephthalate (PET-derived modified PBT component, or modified polybutylene terephthalate copolymers containing residues derived from polyethylene terephthalate) that is made by the process of the invention is a random copolymer containing groups selected from the following groups:

where R' is a terephthalic acid group (-1,4-($C_6H_4$)— group)

R" is—an isophthalic acid group (1,3-($C_6H_4$)—)

D is butane diol group (—($C_4H_8$)—)

D' is ethylene glycol group (—($C_2H_4$)—)

The modified polybutylene terephthalate copolymers containing residues derived from polyethylene terephthalate can also contain diethylene glycol groups.

The amount of the ethylene glycol groups, diethylene glycol groups, and the isophthalic groups in the polymeric backbone of the modified PBT component can vary. The PET-derived modified PBT component ordinarily contains isophthalic acid groups in an amount that is at least 0.1 mole % and can range from 0 or 0.1 to 10 mole % (0 or 0.07 to 7 wt. %). The PET-derived modified PBT component ordinarily contains ethylene glycol in an amount that is at least 0.1 mole % and can range from 0.1 to 10 mole %. (0.02 to 2 wt. %). In one embodiment, the PET-derived modified PBT component has an ethylene glycol content that is more than 0.85 wt. %. The modified PBT component can also contain diethylene glycol in an amount ranging from 0.1 to 10 mole % (0.04 to 4 wt. %). The amount of the butane diol groups is generally about 98 mole % and can vary from 95 to 99.8 mole % in some embodiments. The amount of the terephthalic acid groups is generally about 98 mole % and can vary from 90 to 99.9 mole % in some embodiments.

Unless otherwise specified, all molar amounts of the isophthalic acid groups and or terephthalic acid groups are based on the total moles of diacids/diesters in the composition. Unless otherwise specified, all molar amounts of the butanediol, ethylene glycol, and diethylene glycol groups are based on the total moles of diol in the composition. The weight percent measurements stated above are based on the way terephthalic acid groups, isophthalic acid groups, ethylene glycol groups, and diethylene glycol groups have been defined herein.

The total amount of materials of the polyethylene terephthalate component residue in the modified polybutylene random copolymer can vary. For instance, mixtures can be in an amount ranging from 1.8 to 2.5 wt. %, or from 0.5 to 2 wt. %, or from 1 to 4 wt. %. The ethylene glycol, diethylene glycol, and cyclohexanedimethanol groups can be individually or in combination present in an amount ranging from 0.1 to 10 mole %, based on 100 mole % of glycol the molding composition. The isophthalic acid groups can be present in an amount ranging from 0.1 to 10 mole %, based on 100 mole % of diacid/diester in the molding composition.

It has been discovered that when it is desirable to make a polybutylene terephthalate copolymers having a melting temperature Tm that is at least 200° C., the total amount of diethylene glycol, ethylene glycol, and isophthalic acid groups should be within a certain range. As such, in one embodiment, the total amount of the diethylene glycol, ethylene glycol, and isophthalic acid groups in the modified polybutylene terephthalate component is more than 0 and less than or equal to 23 equivalents, relative to the total of 100 equivalents of diol and 100 equivalents of diacid groups in the modified polybutylene terephthalate random copolymer. In another suitable embodiment, the total amount of the isophthalic acid groups, ethylene glycol groups, and diethylene glycol groups ranges from 3 and less than or equal to 23 equivalents, relative to the total of 100 equivalents of diol and 100 equivalents of diacid groups in the modified polybutylene terephthalate random copolymer. In another suitable embodiment, the total amount of the isophthalic acid groups, ethylene glycol groups, and diethylene glycol groups ranges from 3 and less than or equal to 10 equivalents, relative to the total of 100 equivalents of diol and 100 equivalents of diacid groups in the modified polybutylene terephthalate random copolymer. In another suitable embodiment, the total amount of the isophthalic acid groups, ethylene glycol groups, and diethylene glycol groups ranges from 10 and less than or equal to 23 equivalents, relative to the total of 100 equivalents of diol and 100 equivalents of diacid groups in the modified polybutylene terephthalate random copolymer. In one embodiment, diethylene glycol, ethylene glycol and/or isophthalic acid can be added during the process.

The total ethylene glycol groups, isophthalic acid groups, and diethylene glycol groups can vary, depending on the application and the user's needs. In one embodiment, the molding composition can have total monomer content selected from the group consisting of ethylene glycol, isophthalic acid groups, and diethylene glycol groups in an amount ranging from more than 0 and less than or equal to 17 equivalents relative to the total of 100 equivalents of diol and 100 equivalents of diacid groups in the modified polybutylene terepthalate random copolymer. Advantageously, such compositions can maintain useful properties, such as heat deflection temperatures that are more than 180° C.

It has also been discovered that the total amount of inorganic residues derived from the polyethylene terephthalate can be present from more than 0 ppm and up to 1000 ppm. Examples of such inorganic residues can be selected from the group consisting of antimony-containing compounds, germanium-containing compounds, titanium-containing compounds, cobalt-containing compounds, tin containing compounds, aluminum, aluminum salts, alkaline earth metal salts, alkali salts, including calcium, magnesium, sodium and potassium salts, phosphorous-containing compounds and anions, sulfur-containing compounds and anions, and combinations thereof. In another embodiment, the amounts of inorganic residues can range from 250 to 1000 ppm. In another embodiment, the amounts of inorganic residues can range from 500 to 1000 ppm.

The PET component from which the modified polybutylene terephthalate random copolymer is made can be in any form that can be used according to our invention. Generally, the PET component includes recycle (scrap) PET in flake, powder/chip, film, or pellet form. Before use, the PET is generally processed to remove impurities such as paper, adhesives, polyolefin, e.g., polypropylene, polyvinyl chloride (PVC), nylon, polylactic acid and other contaminants. Also, the PET component can include PET that is not waste in flake, chip or pellet form. As such, PET that would ordinarily be deposited in landfills can now be used productively and effectively. In one embodiment, PET component can also include other polyesters. The PET component can also include polyester copolymers. Examples of such materials include polyalkylene terephthalates that can be selected from polyethylene terephthalate, polycyclohexane terephthalate, copolyesters of terephthalate esters with comonomers containing cyclohexyl dimethanol and ethylene glycol, copolyesters of terephthalate acid with comonomers containing cyclohexyl dimethanol and ethylene glycol, polybutylene terephthalate, poly-xylylene terephthalate, polydianol terephthalates, polybutylene terephthalate, polytrimethylene terephthalate, polyester naphthalates, and combinations thereof.

A modified polybutylene terephthalate random copolymer derived from the polyethylene terephthalate component can be derived from a polyethylene terephthalate component by any method that involves depolymerization of a polyethylene terephthalate component and polymerization of the depolymerized polyethylene terephthalate component with 1,4-butanediol into the modified polybutylene terephthalate random copolymer. For instance, the modified polybutylene terephthalate component derived from the polyethylene terephthalate component can be made by a process that involves depolymerizing a polyethylene terephthalate component selected from the group consisting of polyethylene terephthalate and polyethylene terephthalate copolymers with a 1,4-butanediol component at a temperature ranging from 180° C. to 230° C., under agitation, at a pressure that is at least atmospheric pressure in the presence of a catalyst component, at an elevated temperature, under an inert atmosphere, to produce a molten mixture containing a component selected from the group consisting of oligomers containing ethylene terephthalate moieties, oligomers containing ethylene isophthalate moieties, oligomers containing diethylene terephthalate moieties, oligomers containing diethylene isophthalate moieties, oligomers containing butylene terephthalate moieties, oligomers containing butylene isophthalate moieties, covalently bonded oligomeric moieties containing at least two of the foregoing moieties, 1,4-butanediol, ethylene glycol, and combinations thereof; and agitating the molten mixture at subatmospheric pressure and increasing the temperature of the molten mixture to an elevated temperature under conditions sufficient to form a modified random polybutylene terephthalate copolymer containing at least one residue derived from the polyethylene terepthalate component.

Polyester moieties and the 1,4-butanediol are combined in the liquid phase under agitation and the 1,4-butanediol can be continuously refluxed back into the reactor during step (a). The THF and water formed in the stage can be removed by distillation or partial condensation.

The polyethylene terephthalate component and the 1,4-butanediol component are generally combined under atmospheric pressure. In another embodiment of the invention, however, it is possible to use pressures that are higher than atmospheric pressures. For instance, in one embodiment, the pressure at which the polyethylene terephthalate component and the 1,4-butanediol are subjected to is 2 atmospheres, or higher. For higher pressures, the reaction mixtures can be depolymerized at temperatures higher than 230° C.

The temperature at which the polyethylene terephthalate component and the 1,4-butanediol component are combined and reacted is sufficient to promote depolymerization of the polyethylene terephthalate component into a mixture of oligomers containing ethylene terephthalate moieties, oligomers containing ethylene isophthalate moieties, oligomers containing diethylene terephthalate moieties, oligomers containing diethylene isophthalate moieties, oligomers containing butylene terephthalate moieties, oligomers containing butylene isophthalate moieties, covalently bonded oligomeric moieties containing at least two of the foregoing moieties, 1,4-butanediol, ethylene glycol, and combinations thereof. The temperature at which the polyethylene terephthalate component and the 1,4-butanediol component are combined generally ranges from 180° C. to 230° C. 1,4-butanediol is generally used in excess amount relative to the polyethylene terephthalate component. In one embodiment, 1,4-butanediol is used in a molar excess amount ranging from 2 to 20.

During the initial stage of the process when the polyethylene terephthalate component and the 1,4-butanediol are combined and react ("step (a)"), the polyethylene terephthalate component and the 1,4-butanediol depolymerize into a molten mixture at a pressure that is at least atmospheric pressure suitable conditions. 1,4-butanediol, ethylene glycol, are generally recirculated, and tetrahydrofuran is distilled during "step(a)" of the process. The molten mixture contains oligomers containing ethylene terephthalate moieties, oligomers containing ethylene isophthalate moieties, oligomers containing diethylene terephthalate moieties, oligomers containing diethylene isophthalate moieties, oligomers containing butylene terephthalate moieties, oligomers containing butylene isophthalate moieties, covalently bonded oligomeric moieties containing at least two of the foregoing moieties, 1,4-butanediol, ethylene glycol, and combinations thereof.

The duration of the step in which polyethylene terephthalate component reacts with 1,4-butanediol can vary, depending on factors, such as available equipment, production needs, desired final properties, and the like. In one embodiment, this step is carried out in at least 2 hours. In another embodiment, the step is carried out from 2 to 5 hours.

The process further includes the step of subjecting the molten mixture to subatmospheric pressure and increasing the temperature of the molten mixture to a temperature ranging from 240° C. to 260° C., and thereby forming the modified polybutylene terephthalate component derived from the polyethylene terephthalate component.

Excess butanediol, ethylene glycol, and tetrahydrofuran (THF) are preferably removed and step (b) is carried out under agitation. The molten mixture, when placed in subatmospheric pressure conditions at a suitable temperature for a sufficiently long time period, polymerizes into a modified polybutylene terephthalate component derived from the polyethylene terephthalate component random copolymer.

Generally, the molten mixture pressure is subjected to a pressure ranging from subatmospheric to less than 1 Torr. In one embodiment, the pressure is reduced to a pressure ranging from 100 to 0.05 Torr in a continuous manner. In another embodiment, the pressure is reduced to a pressure ranging from 10 to 0.1 Torr in a continuous fashion.

Advantageously, the molten mixture can be placed under subatmospheric conditions without isolation and dissolution of any material from the molten mixture. The avoidance of this step greatly enhances the utility of the process.

During the step when the molten mixture is placed under subatmospheric conditions and the temperature is increased, excess butanediol, ethylene glycol and THF are removed from the reactor and oligomers are allowed to build in molecular weight. Agitation can be continuously provided to facilitate the removal of the low boiling components and allow the molecular weight buildup of the polymer. After sufficient molecular weight is obtained, the resulting molten PBT polymer is cast from the reactor through a diehead, cooled with water, stranded and chopped into pellets.

The duration of the step (step (b) discussed above) in which the molten mixture polymerizes from polyethylene terephthalate and poly(butylene terephthlate) oligomers, 1,4, butane diol, and ethylene glycol can vary, depending on factors, such as equipment available, production needs, desired final properties, and the like. In one embodiment, this step is carried out in at least two hours. In another embodiment, the step is carried out from 2 to 5 hours.

The temperature at which the molten mixture is placed under subatmospheric conditions is sufficiently high to promote polymerization of the polyethylene terephthalate and poly(butylene terephthlate) oligomers, 1,4-butanediol, and ethylene glycol to the modified polybutylene terephthalate component derived from the polyethylene terephthalate component. Generally, the temperature is at least 230° C. In one embodiment, the temperature ranges from 250° C. to 275° C.

Both steps of the process can be carried out in the same reactor. In one embodiment, however, the process is carried out in two separate reactors, where step (a) is carried out in a first reactor and when the molten mixture has formed, the molten mixture is placed in a second reactor and step (b) is carried out. In another embodiment, the process can be carried out in more than two reactors. In another embodiment, the process can be carried out in a continuous series of reactors.

The catalyst component that is used to facilitate the reaction of the process generally includes a catalyst that facilitates the reaction. The catalyst can be selected from antimony compounds, tin compounds, titanium compounds, combinations thereof as well as many other metal catalysts and combinations of metal catalysts that have been disclosed in the literature. The amount of the catalyst will vary on the specific need at hand. Suitable amounts of the catalyst range from 1 to 5000 ppm, or more.

The catalyst component is generally added during the step when the polyethylene terephthalate component initially combines with the 1,4-butanediol. In another embodiment, however, the catalyst component may be added to the molten mixture that forms after the polyethylene terephthalate component and the 1,4-butanediol component are combined.

The process for making the modified polybutylene terephthalate component derived from the polyethylene terephthalate component is preferably carried out under agitative conditions. The term "agitative conditions" or "agitation" refers to subjecting the polyethylene terephthalate component and the 1,4-butanediol or the molten mixture to conditions that involve physically mixing the polyethylene terephthalate component 1,4-butanediol or molten mixture under conditions that promote the depolymerization of the PET when the agitative conditions are applied to polyethylene terephthalate component 1,4-butanediol "step (a)", or the polymerization of the PBT from polyethylene terephthalate oligomers, 1,4-butanediol, and ethylene glycol "step (b)." The physical mixing can be accomplished by any suitable way. In one embodiment, a mixer containing rotating shaft and blades that are perpendicular to the shaft can be used.

The process for making the modified polybutylene terephthalate component derived from the polyethylene terephthalate component can include a step that reduces the amount of THF produced during the process by adding a basic compound containing an alkali metal to the reactor in step (a) and thereby reducing formation of THF.

The basic compound contains an alkali metal and can be selected from one or more of the following compounds sodium alkoxides, sodium hydroxide, sodium acetate, sodium carbonate, sodium bicarbonates, potassium alkoxides, potassium hydroxide, potassium acetate, potassium carbonate, potassium bicarbonate, lithium alkoxides, lithium hydroxide, lithium acetate, lithium carbonate, lithium bicarbonate, calcium alkoxides, calcium hydroxide, calcium acetate, calcium carbonate, calcium bicarbonates, magnesium alkoxides, magnesium hydroxide, magnesium acetate, magnesium carbonate, magnesium bicarbonates, aluminium alkoxides, aluminium hydroxide, aluminium acetate, aluminium carbonate, aluminium bicarbonates, and combinations thereof.

The amount of the basic compound added to a mixture is generally at least 0.1 ppm. In one embodiment, the amount of the basic compound is from 0.1 to 50 ppm. In another embodiment, the amount of the basic compound ranges from 1 to 10 ppm.

The addition of the basic compound containing an alkali metal can reduce the amount of total THF production, as compared to when the process is carried out without the basic compound. In one embodiment, the total THF produced during the process is reduced by at least 10%, as compared to a process that does not use the basic compound. In another embodiment, the total THF produced during the process is reduced ranges from at least 10% to 50%, or more.

In another embodiment, a difunctional epoxy compound can be added to reduce the formation of THF. The epoxy compounds may be selected from the group of difunctional epoxies. Examples of suitable difunctional epoxy compounds include and are not limited to difunctional epoxy compounds include, but are not limited to, 3,4-epoxycyclohexyl-3,4-epoxycyclohexyl carboxylate, bis(3,4-epoxycyclohexylmethyl) adipate, vinylcyclohexene di-epoxide, bisphenol diglycidyl ethers such as bisphenol-A diglycidyl ether, tetrabromobisphenol-A diglycidyl ether, glycidol, diglycidyl adducts of amines and amides, diglycidyl adducts of carboxylic acids such as the diglycidyl ester of phthalic acid the diglycidyl ester of hexahydrophthalic acid, and bis(3,4-epoxy-6-methylcyclohexylmethyl)adipate, butadiene diepoxide, vinylcyclohexene diepoxide, dicyclopentadiene diepoxide, and the like. Especially preferred is 3,4-epoxycyclohexyl-3,4 epoxycyclohexylcarboxylate. The amount of the epoxy that may be added to the mixture is generally at least 0.05 wt. %. In one embodiment, the amount of the epoxy compound is from 0.1 to 1 wt. %. In another embodiment, the amount of the epoxy compound was 0.2 to 0.5 wt. %. In one embodiment, the invention provides an additional embodiment in which THF production is reduced by a process that involves the steps of:

(a) reacting (i) a polyethylene terephthalate component selected from the group consisting of polyethylene terephthalate and polyethylene terephthalate copolymers with a diol component selected from the group consisting of ethylene glycol, propylene glycol, and combinations thereof, in a reactor at a pressure that is at least atmospheric pressure in the presence of a catalyst component at a temperature ranging from 190° C. to 250° C., under an inert atmosphere, under conditions sufficient to depolymerize the polyethylene terephthalate component into a first molten mixture containing components selected from the group consisting of oligomers containing ethylene terephthalate moieties, oligomers containing ethylene isophthalate moieties, oligomers containing diethylene terephthalate moieties, oligomers containing diethylene isophthalate moieties, oligomers containing trimethylene terephthalate moieties, oligomers containing trimethylene isophthalate moieties, covalently bonded oligomeric moieties containing at least two of the foregoing moieties, ethylene glycol, propylene glycol and combinations thereof; wherein the polyethylene terephthalate component and the diol component are combined under agitation;

(b) adding 1,4-butanediol to the first molten mixture in a reactor in the presence of a catalyst component at a temperature ranging from 190° C. to 240° C., under conditions that are sufficient to form a second molten mixture containing a component selected from the group consisting of oligomers containing ethylene terephthalate moieties, oligomers containing ethylene isophthalate moieties, oligomers containing diethylene terephthalate moieties, oligomers containing diethylene isophthalate moieties, oligomers containing trimethylene terephthalate moieties, oligomers containing trimethylene isophthalate moieties, oligomers containing butylene terephthalate moieties, oligomers containing butylene isophthalate moieties, covalently bonded oligomeric moieties containing at least two of the foregoing moieties, 1,4-butanediol, propylene glycol, ethylene glycol, and combinations thereof; and (c) increasing the temperature of the second molten mixture under subatmospheric conditions and agitation to a temperature from 240° C. to 260° C., thereby forming a modified random polybutylene terephthalate copolymer containing at least one residue derived from the polyethylene terepthalate component.

This three step embodiment provides an additional advantageous way for producing modified PBT random copolymers from PET. The diol component used in step (a) of the three step embodiment can be selected from ethylene glycol, propylene glycol, and combinations thereof. The diol component can be present in step (a) at a molar amount that is at least half the amount of ethylene glycol moieties present in the polyethylene terephthalate component. The depolymerization of the polyethylene terephthalate component can be carried out for various times. In one embodiment, the depolymerization is carried out for at least 25 minutes.

The 1,4-butanediol used during step (b) of the three step embodiment can be added at a molar amount that is in excess relative to the molar amount of butanediol moieties incorporated into the modified polybutylene terephthalate random copolymer component obtained in step (c).

During the process the compounds used in the process can be reused and/or collected. In one embodiment, the diol component selected from the group consisting of ethylene glycol, propylene glycol, and combinations thereof and (2) 1,4-butanediol are removed and collected in a vessel in step (b). In another embodiment, in step (b), 1,4-butanediol is refluxed back into the reactor and a component selected from the group of excess butanediol, ethylene glycol, propylene glycol, tetrahydrofuran, and combinations thereof is removed. Step (b) is practiced for a sufficient period of time to reduce at least 65% of ethylene glycol from the second molten mixture. The duration of step (b) can also vary. In one embodiment, step (b) lasts at least 45 minutes. The pressure at which step (b) is carried out can vary. In one embodiment, step (b) is carried out in atmospheric conditions. In another embodiment, step (b) is carried out in subatmospheric conditions. Different combinations are possible. In one embodiment, step (b) is carried out with excess 1,4-butanediol and at a pressure ranging from 300 to 1500 mbar absolute. In another embodiment, 1,4-butanediol is used in a molar excess amount ranging from 1.1 to 5.

Step(c) of the three step embodiment can also be carried out with modifications, depending on the application. In one embodiment, for instance, a component selected from the group of excess butanediol, ethylene glycol, propylene glycol, tetrahydrofuran, and combinations thereof is removed during step (c). The pressure at which step (c) is carried out can also vary. In one embodiment, step (c) is carried out at a pressure that is less than 10 mbar. The three step process can be carried out in the same reactor. Alternatively, the three step process can be carried out in at least two reactors.

In another embodiment, the three step process can include the step of adding a basic compound during step (a), step (b), step (c), and combinations thereof, and thereby further reduce THF production. The basic compound, as in the two step embodiment, can contain those compounds mentioned above. Alternatively, difunctional epoxy compounds can be added during step (b) in the amounts indicated above.

Advantageously the three step process can reduce tetrahydrofuran by an amount that is at least 30% as compared to the amount of tetrahydrofuran produced by a process that depolymerizes polyethylene terephthalate component with 1,4-butanediol instead of the diol component selected from the group consisting of ethylene glycol, propylene glycol, and combinations thereof.

The process for making the modified polybutylene terephthalate component derived from the polyethylene terephthalate component may contain an additional step in which the PBT formed from the molten mixture is subjected to solid-state polymerization. Solid-state polymerization generally involves subjecting the PBT formed from the molten mixture to an inert atmosphere or subatmospheric pressure and heating to a temperature for a sufficient period of time to build the molecular weight of the PBT. Generally, the temperature to which the PBT is heated is below the melting point of the PBT, e.g., from 5° C. to 60° C. below the melting point of the PBT. In one embodiment, such a temperature may range from 150° C. to 210° C. Suitable periods of time during which the solid-state polymerization occurs may range from 2 to 20 hours, depending on the conditions and equipment. The solid-state polymerization is generally carried out under tumultuous conditions sufficient to promote further polymerization of the PBT to a suitable molecular weight. Such tumultuous conditions may be created by subjecting the PBT to tumbling, the pumping of inert gas into the system to promote fluidization of polymer particle, e.g., pellets, chips, flakes, powder, and the like. The solid-state polymerization can be carried out at atmospheric pressure and/or under reduced pressure, e.g. from 1 atmosphere to 1 mbar.

Our invention includes an embodiment in which the 1,4-butanediol can be derived from biomass. The term "biomass" means living or dead biological matter that can be directly or subsequently converted to useful chemical substances that are ordinarily derived from non-renewable hydrocarbon sources. Biomass can include cellulosic materials, grains, starches derived from grains, fatty acids, plant based oils, as well as derivatives from these biomass examples. Examples of useful chemical substances include and are not limited to diols; diacids; monomers used to make diols or acids, e.g., succinic acid; monomers used to make polymers; and the like. Biomass based butane diol can be obtained from several sources. For instance, the following process can be used to obtain biomass-based 1,4-butanediol. Agriculture based biomass, such as corn, can be converted into succinic acid by a fermentation process that also consumes carbon dioxide. Such succinic acid is commercially available from several sources such as from Diversified Natural Products Inc. under the trade name "BioAmber™". This succinic acid can be easily converted into 1,4-butanediol by processes described in several published documents such as in U.S. Pat. No. 4,096,156, incorporated herein in its entirety. Bio-mass derived-1,4-butanediol can also be converted to tetrahydrofuran, and further converted to polytetrahydrofuran, also known as polybutylene oxide glycol. Another process that describes converting succinic acid into 1,4-butane diol is described in Life Cycles Engineering Guidelines, by Smith et al., as described in EPA publication EPA/600/R-1/101 (2001).

The amount of the modified polybutylene terephthalate random copolymer (PET-derived modified PBT component) in a molding composition varies with the specific application. Generally, the amount of the PET-derived modified PBT component in a molding composition of the invention ranges from to 5 to 90 wt. %. In another embodiment, the amount of the PET-derived modified PBT component is present ranges from 10 to 50 wt. %. In one embodiment, the amount can range from 40 to 99.99 wt %. In another embodiment, the amount can range from 80 to 99.99 wt %. When the PBT component includes at least two polyesters components having different intrinsic viscosities, the amounts of the respective polyester components can vary.

The carboxy-reactive material is a monofunctional or a polyfunctional carboxy-reactive material that can be either polymeric or non-polymeric, or combinations thereof. Examples of carboxy-reactive groups include epoxides, carbodiimides, orthoesters, oxazolines, oxiranes, aziridines, and anhydrides. The carboxy-reactive material can also include other functionalities that are either reactive or non-reactive under the described processing conditions. Non-limiting examples of reactive moieties include reactive silicon-containing materials, for example epoxy-modified silicone and silane monomers and polymers. If desired, a catalyst or co-catalyst system can be used to accelerate the reaction between the carboxy-reactive material and the polyester.

The term "polyfunctional" or "multifunctional" in connection with the carboxy-reactive material means that at least two carboxy-reactive groups are present in each molecule of the material. Particularly useful polyfunctional carboxy-reactive materials include materials with at least two reactive epoxy groups. The polyfunctional epoxy material can contain aromatic and/or aliphatic residues. Examples include epoxy novolac resins, epoxidized vegetable (e.g., soybean, linseed) oils, tetraphenylethylene epoxide, styrene-acrylic copolymers containing pendant glycidyl groups, glycidyl methacrylate-containing polymers and copolymers, and difunctional epoxy compounds such as 3,4-epoxycyclohexylmethyl-3,4-epoxycyclohexanecarboxylate.

In one embodiment, the polyfunctional carboxy-reactive material is an epoxy-functional polymer, which as used herein include oligomers. Exemplary polymers having multiple epoxy groups include the reaction products of one or more ethylenically unsaturated compounds (e.g., styrene, ethylene and the like) with an epoxy-containing ethylenically unsaturated monomer (e.g., a glycidyl $C_{1-4}$ (alkyl)acrylate, allyl glycidyl ethacrylate, and glycidyl itoconate).

For example, in one embodiment the polyfunctional carboxy-reactive material is a styrene-acrylic copolymer (including an oligomer) containing glycidyl groups incorporated as side chains. Several useful examples are described in the International Patent Application WO 03/066704 A1, assigned to Johnson Polymer, LLC, which is incorporated herein by reference in its entirety. These materials are based on copolymers with styrene and acrylate building blocks that have glycidyl groups incorporated as side chains. A high number of epoxy groups per polymer chain is desired, at least about 10, for example, or greater than about 15, or greater than about 20. These polymeric materials generally have a molecular weight greater than about 3000, preferably greater than about 4000, and more preferably greater than about 6000. These are commercially available from Johnson Polymer, LLC under the Joncryl® trade name, preferably the Joncryl® ADR 4368 material.

Another example of a carboxy-reactive copolymer is the reaction product of an epoxy-functional $C_{1-4}$(alkyl)acrylic monomer with a non-functional styrenic and/or $C_{1-4}$(alkyl) acrylate and/or olefin monomer. In one embodiment the epoxy polymer is the reaction product of an epoxy-functional (meth)acrylic monomer and a non-functional styrenic and/or (meth)acrylate monomer. These carboxy reactive materials are characterized by relatively low molecular weights. In another embodiment, the carboxy reactive material is an epoxy-functional styrene (meth)acrylic copolymer produced from an epoxy functional (meth)acrylic monomer and styrene. As used herein, the term "(meth)acrylic" includes both acrylic and methacrylic monomers, and the term "(meth) acrylate includes both acrylate and methacrylate monomers. Examples of specific epoxy-functional (meth)acrylic monomers include, but are not limited to, those containing 1,2-epoxy groups such as glycidyl acrylate and glycidyl methacrylate.

Suitable $C_{1-4}$(alkyl)acrylate comonomers include, but are not limited to, acrylate and methacrylate monomers such as methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, and isobornyl methacrylate. Combinations comprising at least one of the foregoing comonomers can be used.

Suitable styrenic monomers include, but are not limited to, styrene, alpha-methyl styrene, vinyl toluene, p-methyl styrene, t-butyl styrene, o-chlorostyrene, and mixtures comprising at least one of the foregoing. In certain embodiments the styrenic monomer is styrene and/or alpha-methyl styrene.

In another embodiment, the carboxy reactive material is an epoxy compound having two terminal epoxy functionalities, and optionally additional epoxy (or other) functionalities. The compound can further contain only carbon, hydrogen, and oxygen. Difunctional epoxy compounds, in particular those containing only carbon, hydrogen, and oxygen can have a molecular weight of below about 1000 g/mol, to facilitate blending with the polyester resin. In one embodiment the difunctional epoxy compounds have at least one of the epoxide groups on a cyclohexane ring. Exemplary difunctional epoxy compounds include, but are not limited to, 3,4-epoxycyclohexyl-3,4-epoxycyclohexyl carboxylate, bis(3,4-epoxycyclohexylmethyl)adipate, vinylcyclohexene di-epoxide, bisphenol diglycidyl ethers such as bisphenol-A diglycidyl ether, tetrabromobisphenol-A diglycidyl ether, glycidol, diglycidyl adducts of amines and amides, diglycidyl adducts of carboxylic acids such as the diglycidyl ester of phthalic acid the diglycidyl ester of hexahydrophthalic acid, and bis(3,4-epoxy-6-methylcyclohexylmethyl)adipate, butadiene diepoxide, vinylcyclohexene diepoxide, dicyclopentadiene diepoxide, and the like. Especially preferred is 3,4-epoxycyclohexyl-3,4 epoxycyclohexylcarboxylate.

The difunctional epoxy compounds can be made by techniques well known to those skilled in the art. For example, the corresponding α- or β-dihydroxy compounds can be dehydrated to produce the epoxide groups, or the corresponding unsaturated compounds can be epoxidized by treatment with a peracid, such as peracetic acid, in well-known techniques. The compounds are also commercially available.

Other preferred materials with multiple epoxy groups are acrylic and/or polyolefin copolymers and oligomers containing glycidyl groups incorporated as side chains. Suitable epoxy-functional materials are available from Dow Chemical Company under the tradename D.E.R.332, D.E.R.661, and D.E.R.667; from Resolution Performance Products under the trade name EPON Resin 1001F, 1004F, 1005F, 1007F, and 1009F; from Shell Oil Corporation under the tradenames Epon 826, 828, and 871; from Ciba-Giegy Corporation under the tradenames CY-182 and CY-183; and from Dow Chemical Co. under the tradename ERL-4221 and ERL-4299. As set forth in the Examples, Johnson Polymer Co is a supplier of an epoxy functionalized material known as ADR4368 and 4300. A further example of a polyfunctional carboxy-reactive material is a co- or terpolymer including units of ethylene and glycidyl methacrylate (GMA), sold by Arkema under the trade name LOTADER®.

In still another embodiment, the carboxy-reactive material is a multifunctional material having two or more reactive groups, wherein at least one of the groups is an epoxy group and at least one of the groups is a group reactive with the polyester, but is not an epoxy group. The second reactive group can be a hydroxyl, an isocyanate, a silane, and the like.

Examples of such multifunctional carboxy-reactive materials include materials with a combination of epoxy and silane functional groups, preferably terminal epoxy and silane groups. The epoxy silane is generally any kind of epoxy silane wherein the epoxy is at one end of the molecule and attached to a cycloaliphatic group and the silane is at the other end of the molecule. A desired epoxy silane within that general description is of the following formula:

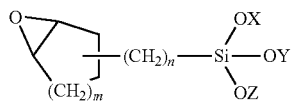

wherein m is an integer of 1, 2 or 3, n is an integer of 1 to 6, inclusive, and X, Y, and Z are the same or different, preferably the same, and are alkyl groups of one to twenty carbon atoms, inclusive, cycloalkyl of four to ten carbon atoms, inclusive, alkylene phenyl wherein alkylene is one to ten carbon atoms, inclusive, and phenylene alkyl wherein alkyl is one to six carbon atoms, inclusive. Desirable epoxy silanes within this range are compounds wherein m is 2, n is 1 or 2, desirably 2, and X, Y, and Z are the same and are alkyl of 1, 2, or 3 carbon atoms inclusive. Epoxy silanes within the range which in particular can be used are those wherein m is 2, n is 2, and X, Y, and Z are the same and are methyl or ethyl.

Such materials include, for example, β-(3,4-epoxycyclohexyl)ethyltriethoxysilane, available under the trade name CoatOSil 1770 from GE. Other examples are β-(3,4-epoxycyclohexyl)ethyltrimethoxysilane, available under the trade name Silquest A-186 from GE, and 3-glycidoxypropyltriethoxysilane, available under the trade name Silquest Y-15589 from GE.

The carboxy-reactive material is added to the polyester compositions in amounts effective to improve visual and/or measured physical properties. In one embodiment, the carboxy-reactive materials are added to the polyester compositions in an amount effective to improve the solvent resistance of the composition, in particular the fuel-resistance of the composition. A person skilled in the art may determine the optimum type and amount of any given carboxy-reactive material without undue experimentation, using the guidelines provided herein.

The type and amount of the carboxy reactive material will depend on the desired characteristics of the composition, the type of polyester used, the type and amount of other additives present in the composition and like considerations, and is generally at least 0.01 weight percent (wt. %) based on the weight of the total composition. In one embodiment, the amount of the carboxy-reactive material is 0.01 to 20 wt. %. In one embodiment, the amount of the carboxy-reactive material is 0.01 to 30 wt. %, or more.

A molding composition of the invention may further contain a ultraviolet stabilizer. Suitable ultraviolet stabilizers generally include a wide variety of ultraviolet absorbers. Examples of ultraviolet absorbers include, but are not limited to, salicylic acid ultraviolet absorbers, benzophenone ultraviolet absorbers, benzotriazole ultraviolet absorbers, cyanoacrylate ultraviolet absorbers and mixtures thereof.

The amount of the ultraviolet stabilizer that can be in the molding composition is generally at least 0.01 wt %. In one embodiment, the amount of the ultraviolet stabilizer ranges from 0.01 to 0.5 wt. %. In another embodiment, the amount of the ultraviolet stabilizer ranges from 0.5 to 1 wt. %.

In another embodiment, the molding composition may also include an impact modifier. The impact modifier component is generally a rubbery material, which when used in suitable amounts, imparts energy absorbing properties to the composition. Suitable rubbery impact modifiers include (a) methacrylate butadiene styrene rubbers, (b) acrylate rubbers, (c) acrylonitrile-styrene-acrylate rubbers, (d) high rubber graft acrylonitrile-butadiene-styrenes, (e) acrylate-olefin copolymers, (f) polyolefin modifiers, or (g) silicone-acrylic modifiers (e.g., METABLEN™ S made by Mitsubishi Rayon).

More particularly, the impact modifier can include an acrylonitrile-butadiene-styrene (ABS) polymer of the high rubber graft impact modifier. Rubber modified monovinylidene aromatic resins comprising (a) a rubber modified monovinylidene aromatic graft copolymer and (b) an ungrafted rigid copolymer, are generally prepared by graft polymerization of a mixture of a monovinylidene aromatic monomer and one or more comonomers in the presence of one or more rubbery polymeric substrates. Depending on the amount of rubber present, a separate matrix or continuous rigid phase of ungrafted rigid (co)polymer may be simultaneously obtained along with the rubber modified monovinylidene aromatic graft polymer. The resins may also be produced by blending a rigid monovinylidene aromatic copolymer with one or more rubber modified monovinylidene aromatic graft copolymers.

Typically, the rubber modified resins comprise the rubber modified graft copolymer at a level of from 5 to 100 percent by weight based on the total weight of the resin, more preferably from 10 to 95 percent by weight thereof, more preferably 20 to 90 percent by weight thereof, and most preferably from 15 to 85 percent by weight thereof; and the rubber modified resin comprises the ungrafted rigid polymer at a level of from 0 to 95 percent by weight based on the total weight of the resin, more preferably from 5 to 90 percent by weight thereof, more preferably from 10 to 80 percent by weight thereof and most preferably from 15 to 85 percent by weight thereof. Higher levels of rubber are preferred.

Especially preferred are acrylonitrile-butadiene-styrene copolymers having greater than 30% by weight rubbery polymeric substrate, preferable greater than about 45% by weight rubbery polymeric substrate. The most preferred rubbery substrates comprise polybutadiene or styrene-butadiene copolymer. Also preferred are high rubber graft acrolonitrile-butadiene-styrene copolymer. The phrase "high rubber graft" refers generally to graft copolymer resins wherein at least about 30% by weight, preferably at least about 45% by weight of the rigid polymeric phase is chemically bound or grafted to the rubbery polymeric phase. Suitable ABS-type high rubber graft copolymers are commercially available from, for example, under the trademark BLENDEX® resin grade 336 or 338. One preferred high rubber graft is CYCOLAC® C874202 resin of General Electric Company, Advanced Materials. A process for producing graft copolymer resins is set forth in U.S. Pat. No. 6,384,129 to Lowry entitled Semi-batch Emulsion Process for Making Diene Rubber Latex, Rubber Latex Made Thereby, and Graft Copolymer Made Therefrom.

Other typical impact modifiers are the following materials, or blends of two or more of these materials: (1) Paraloid EXL3300, which is Butylacylate-Methacrylate core-shell rubber; (2) ASA-HRG, which is Acrylonitrile-Styrene-ButylAcrylate copolymer; (3) AES, which is Acrylonitrile-Styrene-EPDM copolymer, where EPDM is ethylene-propylene non conjugated diene elastomer; (4) Lotader AX8900, which is Ethylene-Methacrylate-Glycidylmethacrylate copolymer with Methacylate content of around 8%. The content of impact modifier is preferable less than 40% by weight, more preferable less than 30 percent, and most preferable less than 20 percent.

Core-shell copolymers, method of making core-shell copolymers and the use of core-shell copolymers as impact modifiers in combination with polycarbonate are described in U.S. Pat. Nos. 3,864,428 and 4,264,487. Suitable core-shell copolymers are those that include a rubbery "core" that has a glass transition temperature ("Tg") below about 10° C. and that comprises repeating units derived from one or more monoethylenically unsaturated monomers such as, e.g. acylate monomers, e.g. butyl acylate, and conjugated diene monomers, e.g., butadiene and a rigid "shell" that has a Tg of greater than or equal to about 10° C. and that has repeating units derived from a monoethylenically unsaturated monomer.

The amount of the impact modifier is generally at least 1 wt %. In one embodiment, the amount of the impact modifier ranges from 1 wt % to 50 wt %. In another embodiment, the amount of the impact modifier ranges from 1 or 5 to 25 wt. %.

A molding composition of the invention may further contain a heat stabilizer. Suitable heat stabilizers include, but are not limited to, phenol stabilizers, organic thioether stabilizers, organic phosphite stabilizers, hindered amine stabilizers, epoxy stabilizers and mixtures thereof. The heat-resistant stabilizer may be added in the form of a solid or liquid.

The amount of the heat stabilizer that can be in the molding composition is generally at least 0.01 wt. %. In one embodiment, the amount of the heat stabilizer ranges from 0.01 to 0.5 wt. %. In another embodiment, the amount of the heat stabilizer ranges from 0.05 to 1 wt. %. In another embodiment, the amount of the heat stabilizer ranges from 0.05 to 3 wt. %.

In another embodiment, in addition to containing the PET-derived modified PBT component, a molding composition can further include mold-release agents. Examples of the mold-release agents include, but are not limited to natural and synthetic paraffins, polyethylene waxes, fluorocarbons, and other hydrocarbon mold-release agents; stearic acid, hydroxystearic acid, and other higher fatty acids, hydroxyfatty acids, and other fatty acid mold-release agents; stearic acid amide, ethylenebisstearamide, and other fatty acid amides, alkylenebisfatty acid amides, and other fatty acid amide mold-release agents; stearyl alcohol, cetyl alcohol, and other aliphatic alcohols, polyhydric alcohols, polyglycols, polyglycerols and other alcoholic mold release agents; butyl stearate, pentaerythritol tetrastearate, and other lower alcohol esters of fatty acid, polyhydric alcohol esters of fatty acid, polyglycol esters of fatty acid, and other fatty acid ester mold release agents; silicone oil and other silicone mold release agents, functionally equivalent materials of the foregoing, and mixtures of any of the aforementioned. The mold release agent can be used in conjunction with other additives, e.g., teflon styrene acrylonitrile.

The amount of the mold release agent can be in the molding composition is generally at least 0.1 wt. %. In one embodiment, the amount of the mold release agent ranges from 0.1 to 2 wt. %. In another embodiment, the amount of the mold release agent ranges from 0.05 or 0.5 to 1 wt. %.

In another embodiment, the amount of the mold release agent ranges from 0.5 to 1 wt. %.

In one embodiment, the composition contains a flame retarding component. The flame-retarding component can be added the composition to suppress, reduce, delay or modify the propagation of a flame through a composition or an article based on the composition. The flame-retarding component can be halogenated hydrocarbons (chlorine and bromine containing compounds and reactive flame retardants), inorganic flame retardants (boron compounds, antimony oxides, aluminum hydroxide, molybdenum compounds, zinc and magnesium oxides), phosphorous containing compounds (organic phosphates, phosphinates, phosphites, phosphonates, phosphene, halogenated phosphorus compounds and inorganic phosphorus containing salts) and nitrogen containing compounds like melamine cyanurate and melamine polyphosphate.

Inorganic flame retardants can include metal hydroxides, antimony compounds, boron compounds, other metal compounds, phosphorous compounds, other inorganic flame-retarding compounds. Examples of suitable metal hydroxides include magnesium hydroxide, aluminum hydroxide, and other metal hydroxides. Examples of suitable antimony-based flame retardants include antimony trioxide, sodium antimonate, antimony pentoxide, and other antimony-based inorganic compounds. Examples of suitable boron compounds include zinc borate, boric acid, borax, as well as other boron-based inorganic compounds. Examples of other metal compounds include molybdenum compounds, molybdenum trioxide, ammonium octa molybdate (AOM), zirconium compounds, titanium compounds, zinc compounds such as zinc stannate, zinc hydroxy-stannate, as well as others.

The flame retarding component can include halogen-containing compounds. Examples of suitable halogenated organic flame retardants can include brominated flame retardants, chlorinated flame retardants. Examples of such flame retardants include tetrabromobisphenol A, octabromobiphenyl ether, decabromodiphenyl ether, bis(tribromophenoxy)ethane, tetrabromobiphenyl ether, hexabromocyclododecane, tribromophenol, bis(tribromophenoxy)ethane tetrabromobisphenol A polycarbonate oligomers, tetrabromobisphenol A epoxy oligomers. Typically halogenated aromatic flame-retardants include tetrabromobisphenol A polycarbonate oligomer, polybromophenyl ether, brominated polystyrene, brominated BPA polyepoxide, brominated imides, brominated polycarbonate, poly(haloaryl acrylate), poly(haloaryl methacrylate), or mixtures thereof.

Examples of other suitable flame retardants are brominated polystyrenes such as polydibromostyrene and polytribromostyrene, decabromobiphenyl ethane, tetrabromobiphenyl, brominated alpha, omega-alkylene-bis-phthalimides, e.g. N,N'-ethylene-bis-tetrabromophthalimide, oligomeric brominated carbonates, especially carbonates derived from tetrabromobisphenol A, which, if desired, are end-capped with phenoxy radicals, or with brominated phenoxy radicals, or brominated epoxy resins.

Chlorinated flame retardants include chlorinated paraffins, bis (hexachlorocyclopentadieno)cyclo-octane as well other such functionally equivalent materials.

The flame-retarding component can include phosphorus-containing compounds. Examples of suitable phosphorous flame retardants include red phosphorus, ammonium polyphosphate. Organophoshorous flame retardants can include halogenated phosphates, non-halogenated compounds. Examples of such materials include tris(1-chloro-2-propyl)phosphate, tris(2-chloroethyl)phosphate, tris(2,3-dibromopropyl)phosphate, phosphate esters, trialkyl phosphates, triaryl phosphates, aryl-alkyl phosphates, and combinations thereof. Other flame retardants can include polyols, phosphonium derivatives, phosphonates, phosphanes, phosphines.

Specific structures of phosphorous-containing compounds are discussed below:

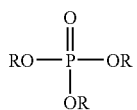

phosphate, where R can be selected from the group of alkyl, aryl, aralkyl, cyclohexyl, isopropyl, isobutyl, and the like.

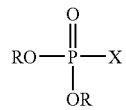

phosphonate, where X is H, and R, where R can be selected from the group of alkyl, aryl, aralkyl, cyclohexyl, isopropyl, isobutyl, and the like.

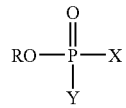

phosphinate, where X and Y=H, and R, where R can be selected from the group of alkyl, aryl, aralkyl, cyclohexyl, isopropyl, isobutyl, and the like, OH, amino functionalized compounds.

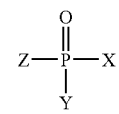

phosphine oxide, where X, Y, Z=H and R, where R can be selected from the group of alkyl, aryl, aralkyl, cyclohexyl, isopropyl, isobutyl, and the like.

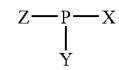

phosphine, where x, y, and z can be selected from the group of H, alkyl, aryl, aralkyl, and the like.

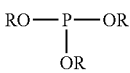

phosphite, where R can be selected from the group of alkyl, aryl, aralkyl, cyclohexyl, isopropyl, isobutyl, and the like, and H.

As such, suitable flame-retarding that may be added may be organic compounds that include phosphorus, bromine, and/or chlorine. Non-brominated and non-chlorinated phosphorus-containing flame retardants may be preferred in certain applications for regulatory reasons, for example organic phosphates and organic compounds containing phosphorus-nitrogen bonds.

One type of exemplary organic phosphate is an aromatic phosphate of the formula $(GO)_3P=O$, wherein each G is independently an alkyl, cycloalkyl, aryl, alkaryl, or aralkyl group, provided that at least one G is an aromatic group. Two of the G groups may be joined together to provide a cyclic group, for example, diphenyl pentaerythritol diphosphate, which is described by Axelrod in U.S. Pat. No. 4,154,775. Other suitable aromatic phosphates may be, for example, phenyl bis(dodecyl)phosphate, phenyl bis(neopentyl)phosphate, phenyl bis(3,5,5'-trimethylhexyl)phosphate, ethyl diphenyl phosphate, 2-ethylhexyl di(p-tolyl)phosphate, bis (2-ethylhexyl)p-tolyl phosphate, tritolyl phosphate, bis(2-ethylhexyl)phenyl phosphate, tri(nonylphenyl)phosphate, bis (dodecyl)p-tolyl phosphate, dibutyl phenyl phosphate, 2-chloroethyl diphenyl phosphate, p-tolyl bis(2,5,5'-trimethylhexyl)phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like. Di- or polyfunctional aromatic phosphorus-containing compounds are also useful, for example, compounds of the formulas below:

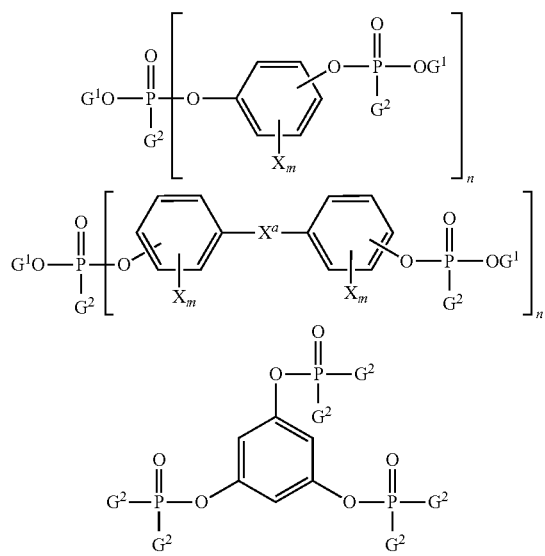

wherein each $G^1$ is independently a hydrocarbon having 1 to about 30 carbon atoms; each $G^2$ is independently a hydrocarbon or hydrocarbonoxy having 1 to about 30 carbon atoms; each $X_m$ is independently a bromine or chlorine; m is 0 to 4; and n is 1 to about 30. Examples of suitable di- or polyfunctional aromatic phosphorus-containing compounds include resorcinol tetraphenyl diphosphate (RDP), the bis(diphenyl) phosphate of hydroquinone and the bis(diphenyl) phosphate of bisphenol-A, respectively, their oligomeric and polymeric counterparts, and the like.

Exemplary suitable flame-retarding compounds containing phosphorus-nitrogen bonds include phosphonitrilic chloride, phosphorus ester amides, phosphoric acid amides, phosphonic acid amides, phosphinic acid amides, tris(aziridinyl) phosphine oxide. When present, phosphorus-containing flame retardants are generally present in amounts of about 1 to about 20 parts by weight, based on 100 parts by weight of the total composition.

In one embodiment, the flame-retarding polyester composition includes a flame retarding quantity of one or a mixture of nitrogen-containing flame retardants such as triazines, guanidines, cyanurates, and isocyanurates. Suitable triazines have the formula

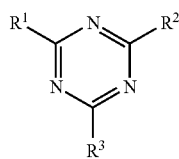

wherein R1, R2, and R3 are independently C 1-C12 alkyl, C1-C12 alkoxyl, C6-C12 aryl, amino, C1-C12 alkyl-substituted amino, or hydrogen. Highly suitable triazines include 2,4,6-triamine-1,3,5-triazine (melamine, CAS Reg. No. 108-78-1), melamine derivatives, melam, melem, melon, ammeline (CAS Reg. No. 645-92-1), ammelide (CAS Reg. No. 645-93-2), 2-ureidomelamine, acetoguanamine (CAS Reg. No. 542-02-9), benzoguanamine (CAS Reg. No. 91-76-9), and the like. Salts/adducts of these compounds with boric acid or phosphoric acid may be used in the composition. Examples include melamine pyrophosphate and melamine polyphosphate. Suitable cyanurate/isocyanurate compounds include salts/adducts of the triazine compounds with cyanuric acid, such as melamine cyanurate and any mixtures of melamine salts.

Suitable guanidine compounds include guanidine; aminoguanidine; and the like; and their salts and adducts with boric acid, carbonic acid, phosphoric acid, nitric acid, sulfuric acid, and the like; and mixtures comprising at least one of the foregoing guanidine compounds.

The nitrogen-containing flame-retardants are used in combination with one or more phosphorous-based compounds. The phosphinates and diphosphinates include those set forth in U.S. Pat. No. 6,255,371 to Schosser et al. Specific phosphinates mentioned include aluminum diethylphosphinate (DEPAL), and zinc diethylphosphinate (DEPZN). The phosphinates have the formula (I)

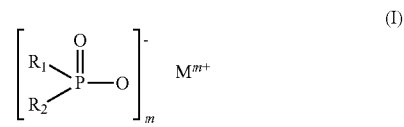

and/or formula II

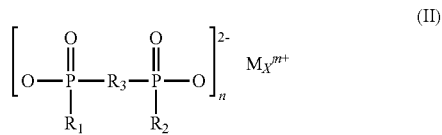

and or polymers comprising such formula I or II, where R1 and R2 are identical or different and are H, C1-C6-alkyl, linear or branched, and/or aryl; R3 is C1-C10, alkylene, linear or branched, C6-C10-arylene, -alkylarylene or -arylalkylene; M is any metal, but suitable are magnesium, calcium, aluminum or zinc, m is 1, 2 or 3; n is 1, 2 or 3; x is 1 or 2.

In one embodiment, R1 and R2 can be H, in addition to the substituents referred to set forth. This results in a hypophosphite, a subset of phosphinate, such as Calcium hypophosphite, aluminum hypophosphite and the like.

The flame retardants are typically used with a synergist, particularly inorganic antimony compounds. Such compounds are widely available or can be made in known ways. Typical, inorganic synergist compounds include $Sb_2O_5$, $SbS_3$, sodium antimonate and the like. Especially suitable is antimony trioxide ($Sb_2O_3$). Synergists, such as antimony oxides, are typically used at about 0.5 to 15 by weight based on the weight percent of resin in the final composition.

Also, the final composition may contain polytetrafluoroethylene (PTFE) type resins or copolymers used to reduce dripping in flame-retarding thermoplastics. Alternatively, in one embodiment, a composition may also contain polyetherimides.

Flame-retardant additives are desirably present in an amount at least sufficient to reduce the flammability of the polyester resin, preferably to a UL94 V-0 rating. The amount will vary with the nature of the resin and with the efficiency of the additive. The amount of the flame retarding component is generally at least 1 wt. %. In one embodiment, the amount of the flame retarding component ranges from 5 wt. % to 30 wt %. In another embodiment, the amount of the flame retarding component ranges from 10 to 20 wt. %.

The foregoing description is illustrative and it should be clear that a molding composition can include embodiments in which one or more of the optional components are present in the composition. As such, in one embodiment, the invention encompasses a molding composition that includes:

(a) from 70 to 99.99 wt % of a PET-derived modified PBT component having a polymeric backbone that includes the following groups:

 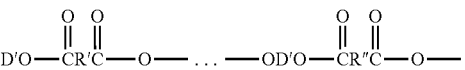

wherein R' is a terephthalic acid group, -1,4-(C6H4)-
R" is an isophthalic acid group, -1,3-(C6H4)-
D is a butane diol group, and —C4H8-
D' is an ethylene glycol group; —C2H4-

(b) from 0.01 to 20 wt. % a polyfunctional carboxy reactive component; and (c) a component selected from the group consisting of impact modifiers, ultraviolet stabilizers, heat stabilizers, mold release agents, and combinations thereof.

The molding compositions of the invention impart physical properties that are useful in various applications. For instance, the impact resistance properties imparted (as measured by notched izod at room temperature) by the molding composition of the invention is generally at least 30 joules/m at room temperature. In one embodiment, the impact resistance imparted by the molding composition ranges from 30 to 200 joules/m. In another embodiment, the impact resistance imparted by the molding composition ranges from 50 to 100 joules/m.) In another embodiment, the impact resistance imparted by the molding composition ranges from 200 to 1000 joules/m.

The tensile elongation @break (%) imparted by a molding composition is generally at least 5%. In another embodiment, the tensile elongation @break (%) ranges from 30% to 300%. In one embodiment, the tensile elongation @break (%) ranges from 40% to 75%.

The tensile stress @ yield (MPa) imparted by a molding composition is generally at least 20 MPa. In another embodiment, the tensile stress @ yield (MPa) ranges from 20 MPa to 200 Mpa. In one embodiment, the tensile stress @ yield (MPa) ranges from 40 to 75 MPa.

The flexural modulus (MPa) imparted by a molding composition is generally at least 1500 MPa. In one embodiment, the flexural modulus (MPa) ranges from 1500 to 10,000 MPa. In another embodiment, the flexural modulus (MPa) ranges from 2000 to 3000 MPa.

The flexural stress @ break (MPa) imparted by a molding composition is generally at least 50 MPa. In another embodiment, the flexural stress @ break (MPa) ranges from 50 to 300 MPa. In one embodiment, the flexural stress @ break (MPa) is 75 to 100 MPa.

The heat deflection temperature at 1.82 MPa for 3.2 mm bars imparted by a molding composition is generally at least 40° C. In another embodiment, the heat deflection temperature ranges from 40° C. to 220° C. In one embodiment, the heat deflection temperature ranges from 40 to 60° C. Compositions can include materials that affect the properties of the composition. The composition, for instance, can further include a material capable of increasing the heat deflection temperature of the composition by at least from 1 to 10° C. Such a material can be selected from the group consisting of talcs having fine particles, nanoparticles, polytetrafluoroethylene clays, mica, and combinations thereof.

The composition of the invention can exhibit a melt volume rate (MVR) that is higher than the MVR of the same composition made with monomer based polybutylene terephthalate homopolymers. A composition, for instance, can have a melt volume rate that is at least 10% higher as compared to a composition made with monomer based polybutylene terephthalate homopolymers, as measured on pellets according to ISO 1133 method at 250° C. and 5 kgf at dwelling time of 240 seconds and a 2.1 mm orifice. In one embodiment, the composition can have a melt volume rate in the range from 10% to 80% or higher, as compared to a composition made with monomer-derived PBT instead of the PBT random copolymers, as measured on pellets according to ISO 1133 method at 250° C. and 5 kgf at dwelling time of 240 seconds and a 2.1 mm orifice. In another embodiment, the composition can have a heat deflection temperature that is at least 80° C., as determined by ASTM D648 at 0.455 MPa.

The mold shrinkage imparted by a molding composition is generally less than 5%. In one embodiment, the mold shrinkage ranges from 0 to 5%. In another embodiment, the mold shrinkage ranges from 2 to 2.5%.

A molding composition of the invention is generally made by combining suitable amounts of the carboxy reactive material, the PET-derived PBT component in an extruder (or a functionally equivalent compounding device), and any other additive, under suitable conditions. The carboxy reactive material, the PET-derived modified PBT component, (and any additional components) may be compounded simultaneously, separately, or in combinations containing two or three of the components. The extrusion process can include one or more passes through an extruder.

Our invention includes methods for making compositions and articles. Our invention, for instance, includes a method of forming a composition comprising melt blending the components of any of our compositions. The method can include shaping, extruding, or molding the melt blended composition. Methods can include molding a melt blended composition into suitable articles. And our compositions include articles derived from any of our compositions.

The invention provides previously unavailable advantages. For instance, the invention provides molding compositions that function comparably with those based on virgin PBT, despite containing structurally different isophthalic groups and ethylene glycol groups derived from the PET used to make the PBT. Since the molding compositions do not require the conventionally prepared PBT, the invention increases demand for the use of PET scrap by producing PBT compositions of increased value and thereby reducing the need to dispose PET in landfills or by incineration. The compositions additionally exhibit enhanced properties from the use of polyfunctional carboxy reactive materials.

Further, the process for making the PET-derived random, modified PBT copolymers used in our compositions can advantageously substantially reduce carbon dioxide emissions and solid waste. Since the PET-derived polyester random modified PBT copolymers made by the inventive process are made from scrap PET and not monomers, the process significantly reduces the amount of carbon dioxide emissions and solid waste. Carbon waste reduction (or crude oil savings) occurs because the carbon that constitutes the dimethyl terephthalate or terephthalic acid ordinarily used to make polyesters is not used, rather a PET component, e.g., polyester scrap, is replaced. The process to make DMT or TPA from crude oil is highly energy intensive and as a result, substantial emissions of CO2 to the atmosphere occur from burning of non-renewable energy sources. By not using DMT or TPA to make the PET derived PBT, carbon dioxide emissions savings are obtained. In one embodiment, the process for making PET-derived modified PBT can eliminate at least 1 kg of $CO_2$ emissions for every kilogram of PET-derived modified PBT made with the process, as compared to a process that makes virgin PBT homopolymers from monomers. In another embodiment, the process for making PET-derived modified PBT can eliminate from 1 kg to 1.5 kg, or more $CO_2$ emissions for every kilogram of PET-derived modified PBT made with the inventive process, as compared to a process that makes virgin PBT homopolymers from monomers. Additionally, there are energy savings/reduced carbon dioxide emissions when the ethylene glycol byproduct is recovered and is used instead of ordinary ethylene glycol in manufacturing.

Additionally, when the source of BDO is from biomass derived, feedstocks such as succinic acid, the carbon dioxide savings are further increased for two reasons. Bio derived succinic acid is made form sugars or other bio derived hydrocarbons that are the derived from atmospheric carbon versus fossil fuel carbon sources, thus reducing the environmental impact of the polymer derived from BDO based on succinic acid from biomass sources. Furthermore, the fermentation to yield succinic acid requires carbon dioxide as an input thus leading to further carbon dioxide reductions.

Advantageously, a molding composition containing the modified polybutylene terephthalate random copolymers can have a reduced $CO_2$ emissions index. The reduced $CO_2$ emissions index, as defined in this application, is the amount of $CO_2$, expressed in kg, that is saved when one (1) kg of a composition containing the modified polybutylene terephthalate random copolymers is made, as compared to the amount of $CO_2$, expressed in kg, that is created when the composition is made with polybutylene terephthalate that is derived from monomers. Generally, our compositions generally have a reduced $CO_2$ emissions index that is more than approximately 0.06 kg, and can range from 0.06 kg to 2.25.

The basis for this feature is discussed below. The difference between the amount of $CO_2$ that is created during ordinary processes for making virgin, monomer-derived PBT and the process for making 1 kg of the modified polybutylene terephthalate random copolymers can range from 1.3 kg to 2.5 kg, or more suitably from 1.7 kg to 2.2 kg. It should be noted that this difference is based on calculations for the entire process that starts from crude oil to the monomers to the PBT versus scrap PET to oligomers to the modified PBT. In other words, the process for making 1 kg of the modified polybutylene terephthalate random copolymers creates 1.3 to 2.5 kilograms less $CO_2$ as compared to the process for making 1 kg of virgin PBT from crude oil. To determine the ranges of the reduced $CO_2$ emissions index for our compositions (which have the modified PBT random copolymers present in an amount ranging from 5 to 90 wt. %), the $CO_2$ reduction index can be calculated by multiplying the lower amount of the polybutylene terephthalate present in the composition, in percentage terms, with 1.3 (0.05×1.3=0.065) and the higher amount of the polybutylene terephthalate times 2.5. (0.90×2.5=2.25).

These results can be derived and verified by using material and energy balance calculations (calculations that are well know in the chemical engineering art) and comparing the amount of energy used to make modified PBT random copolymers from PET and the amount of energy used to make PBT from terephthalic acid.

The invention is further described in the following illustrative examples in which all parts and percentages are by weight unless otherwise indicated.

EXAMPLES

Materials

The following table gives a list of the ingredients used in the examples of the inventions.

| Abbreviation | Description |
| --- | --- |
| PET Derived PBT (0.66 iv) | Poly(1,4-butylene terephthalate) derived from PET, intrinsic viscosity of 0.66 dL/g as measured in a 60:40 phenol/tetrachloroethane mixture |
| PET Derived PBT (1.0 iv) | Poly(1,4-butylene terephthalate) derived from PET, intrinsic viscosity of 0.66 dL/g as measured in a 60:40 phenol/tetrachloroethane mixture |
| PET Derived PBT (1.2 iv) | Poly(1,4-butylene terephthalate) derived from PET, intrinsic viscosity of 0.66 dL/g as measured in a 60:40 phenol/tetrachloroethane mixture |
| GE PBT 195 (0.66 iv) | Poly(1,4-butylene terephthalate) from General Electric Company, intrinsic viscosity of 0.66 dL/g as measured in a 60:40 phenol/tetrachloroethane mixture |
| GE PBT 315 (1.2 iv) | Poly(1,4-butylene terephthalate) from General Electric Company, intrinsic viscosity of 1.2 dL/g as measured in a 60:40 phenol/tetrachloroethane mixture |
| Lotader AX8900 | Random Terpolymer of Ethylene (E), Acrylic Ester (AE) andGlycidyl Methacrylate Ester (GMA) from Arkema |
| Seenox 412S | Thioester, Pentaerythritol tetrakis(3-(dodecylthio)propionate) sold as SEENOX 412-S from Crompton |
| IRGAPHOS 168 | Phosphite, 2,4-di-tert-butylphenol phosphite (3:1) sold as IRGAPHOS 168 from Ciba Geigy |
| ERL4221 | 3,4-epoxycyclohexylmethyl-3-4-epoxy-cyclohexyl carboxylate for DOW Chemical |
| NaSt | Sodium Stearate |

| Abbreviation | Description |
|---|---|
| PETS | pentaerythritol tetrastearate |
| Acrylic Impact Modifier | Acrylic impact modifier from Rohm and Haas EXL3330, Emulsion copolymer of methacrylate-butyl acrylate with core-shell structure. |
| PC 100 | PC bisphenol polycarbonate Lexan ® resin from General Electric Company. Mn by GPC against polystyrene standards is 29 Kg/mol. |
| Glass Fiber | E glass with diameter of 10 or 13 um. Sizing-coated glass fibers are commercially available from Owens Corning Fiberglass as, for example, OCF K filament glass fiber 183F |
| Anitioxidant 60 | tetrakis(methylene(3,5-di-t-butyl-4-hydroxyhydocy |
| Brominated Epoxy | TBBPA diglycidyl ether copolymer |
| Hindered Phenol Stabilizer | Pentaerythritol-tetrakis(3,5-di-t-butyl-4-hydroxy-phenyl)-propionate) |
| HYTREL 4056 as F121 | Polybutylene tere/iso phthalate-co-polyoxybutylene |
| LEXAN 4701R-110001 | LEXAN 4701R-110001 |
| LEXAN ML8199-111N | LEXAN ML8199-111N |
| PC 80%/EMA-GMA 20% Concentrate | Concentrate (80% PC) Lotader AX8900 (20%) |
| Phosphorous Acid 45% | 45% Phosphorous Acid Solution |
| Sb2O3/PE Concentrate (80/20) | Sb2O3 Concentrate (80/20) |
| UVA234 | 2-(2-hydroxy-3,5-di-cumyl)benzotriazole Powder & Freeflowing |
| Low Density Polyethylene | Low Density Polyethylene |

Procedure 1:

The ingredients of the examples shown below in Tables, were extruded on a 40 mm Werner Pfleiderer Twin Screw Extruder with a vacuum vented mixing screw, at a barrel and die head temperature between 240 and 265 degrees C. and 150 to 300 rpm screw speed. The extruder had 8 independent feeders for different raws and could be operated at a maximum rate of 300 lbs/hr (136 kg/hr). The extrudate was cooled through a water bath prior to pelletizing. Test parts were injection molded on a van Dorn molding machine with a set temperature of approximately 240 to 265° C. The pellets were dried for 3-4 hours at 120° C. in a forced air circulating oven prior to injection molding.

Procedure 2

The ingredients of the examples shown below in the indicated tables were extruded on a 37 mm Toshiba TEM-37BS Twin Screw Extruder with a vacuum vented mixing screw, at a barrel and die head temperature between 240 and 265 degrees C. and 150 to 300 rpm screw speed. The extruder has 8 independent feeders for different raws and can be operated at a maximum rate of 200 lbs/hr. The extrudate was cooled through a water bath prior to pelletizing. Test parts were injection molded on NISSEI ES3000 (for ASTM bars) or FANUC S-2000i (for ISO bars) molding machines with a set temperature of approximately 240 to 265° C. The pellets were dried for 3-4 hours at 120° C. in a forced air circulating oven prior to injection molding.

Procedure 3

The ingredients of the examples shown below in Tables, were extruded on a 27 mm Werner Pfleiderer Twin Screw Extruder with a vacuum vented mixing screw, at a barrel and die head temperature between 240 and 265 degrees C. and 400 to 500 rpm screw speed. The extruder has 4 independent feeders for different raws and can be operated at a maximum rate of 75 lbs/hr (34 kg/hr). The extrude rate was cooled through a water bath prior to pelletizing. Test parts were injection molded on a van Dorn molding machine with a set temperature of approximately 240 to 265° C. The pellets were dried for 3-4 hours at 120° C. in a forced air circulating oven prior to injection molding.

Procedure 4

The ingredients of the examples shown below in the respective tables were extruded on a Second Generation 30 mm co-rotating twin-screw extruder. This extruder is fitted with 9 barrel sections (L/D=29) and 2 feeders for introducing raw materials to the feed throat. Typically the materials were fed to the extruder at a rate between 30 lbs(13.6 kgs) and 60 lbs (27.3 kgs) per hour. The screw speed is typically adjusted to a value between 300 and 500 RPM. To minimize the specific energy and residence time of the material, the exact combination of feed rate and screw speed are selected to produce high feed rate and high torque. Compounded pellets were dried for 3-4 hours at 250° F.(121° C.) in an air-circulating oven prior to molding. A van Dorn injection-molding machine was used with following temperature profile (rear to front): 554(290° C.), 570(299° C.), 570(299° C.), 590° F.(310° C.). Typical settings were as follows: 100 rpm screw speed, 600 psi(421,800 kg/m$^2$) hold pressure, 75 psi(52,725 kg/m$^2$) back pressure, and 30 sec cycle times. Temperatures at the front of the barrel and hold/back pressures were adjusted to accommodate differences in the processability between formulations. All standard parts were 0.125"(3.12 mm) thick.

Testing Procedure

Melt Volume Rate (MVR) on pellets (dried for 2 hours at 120° C. prior to measurement) was measured according to ISO 1133 method at dwelling time of 240 seconds and 0.0825 inch (2.1 mm) orifice.

Capillary viscosity, which is another indicator of melt-flow was measured by ASTM D3835 or ISO D11433. Dried pellets were extruded through a capillary Rheometer and the force at varied shear rates was determined to estimate the shear viscosity.

Tensile properties were tested according to ISO 527 on 150×10×4 mm (length×wide×thickness) injection molded bars at 23° C. with a crosshead speed of 5 mm/min. Izod unnotched impact was measured at 23° C. with a pendulum of 5.5 Joule on 80×10×4 mm (length×wide×thickness) impact bars according to ISO 180 method. Flexural properties or three point bending were measured at 23° C. on 80×10×4 mm (length×wide×thickness) impact bars with a crosshead speed of 2 mm/min according to ISO 178.

In other cases, injection molded parts were tested by ASTM. Notched Izod testing as done on 3×½×⅛ inch (76.2× 12.7×3.2 mm) bars using ASTM method D256. Bars were notched prior to oven aging, samples were tested at room temperature. Tensile elongation at break was tested on 7×⅛ in. (177.8×3.3 mm) injection molded bars at room temperature with a crosshead speed of 2 in./min (50.8 mm/min) for glass filled samples and 0.2 in/min (5.08 mm/min) for unfilled samples by using ASTM D648. Flexural properties were measured using ASTM 790 or ISO 178 method. Biaxial impact testing, sometimes referred to as instrumented impact testing, was done as per ASTM D3763 using a 4×⅛ inch (101.6×3.2 mm) molded discs. The total energy absorbed by the sample was reported as ft-lbs or J. Testing was done at room temperature on as molded or oven aged samples. Heat Deflection Temperature was tested on five bars having the dimensions 5×0.5×0.125 inches (127×12.7×3.2 mm) using ASTM method D648.

A synopsis of all the relevant tests and test methods is given in Table 1.

TABLE 1

Test Methods and Descriptions

|  | Test Standard | Default Specimen Type | Units |
| --- | --- | --- | --- |
| ASTM Flexural Test | ASTM D790 | Bar - 127 × 12.7 × 3.2 mm | MPa |
| ISO Flexural Test | ISO 178 | Multi-purpose ISO 3167 Type A | MPa |
| ASTM HDT Test | ASTM D648 | Bar - 127 × 12.7 × 3.2 mm | ° C. |
| ISO HDT Test | ISO 75 | Bar - 80 × 10 × 4 mm | ° C. |
| ASTM HDT Test | ASTM D648 | Bar - 127 × 12.7 × 3.2 mm | ° C. |
| ISO HDT Test | ISO 75 | Multi-purpose ISO 3167 Type A | ° C. |
| ASTM Filled Tensile Test | ASTM D638 | ASTM Type I Tensile bar | MPa |
| ISO Filled Tensile Test | ISO 527 | Multi-purpose ISO 3167 Type A | MPa |
| ISO Izod at Room Temperature | ISO 180 | Multi-purpose ISO 3167 Type A | kJ/m$^2$ |
| ASTM Izod at Room Temperature | Notched ASTM D256 | Bar - 63.5 × 12.7 × 3.2 mm | J/m |
| ASTM Multiaxial Impact | ASTM D3763 | Disk - 101.6 mm dia × 3.2 mm thick | J |
| ISO Charpy Impact | ISO 179 | Bar - 80 × 10 × 4 mm | kJ/m$^2$ |
| ISO Density | ISO 1183 | Bar - 80 × 10 × 4 mm | g/cm$^3$ |
| Shrinkage | GEP Method | Disk - 101.6 mm dia × 3.2 mm thick | % |
| ISO Melt Volume Rate Test | ISO 1133 | Pellets | cm$^3$/10 min |
| ASTM Melt Flow Rate | ASTM D1238 | Pellets | g/10 min |
| ISO Vicat Softening Temp | ISO 306 | Bar - 80 × 10 × 4 mm | ° C. |
| ISO Coefficient of Thermal Expansion | ISO 11359-2 | Multi-purpose ISO 3167 Type A | um/(m-° C.) |

Aging Testing Procedure Pertaining to Examples 1 and 2

Tensile bars molded from the molding compositions shown in Table 3, including examples 1 and 2, were placed into containers that were loaded inside an autoclave chamber set at 110 degrees C. and 100% relative humidity. Five bars pertaining to each example were removed from the chamber at each time period of 1, 3, and 7 days from the start of exposure. The bars were then subjected to tensile testing and percent retention values were calculated giving the percentage of a retained property value of 2 comparative with respect to Example 1.

The following examples illustrate the present invention, but are not meant to be limitations to the scope thereof. The examples of Tables below were all extruded and molded according to procedures as shown in Table 2.

TABLE 2

Extrusion Procedures for Different Samples

| Examples | Procedures |
| --- | --- |
| 1-2 | 1 |
| 3-4 | 2 |
| 5-6 | 3 |
| 7-8 | 3 |
| 9-13 | 4 |

All compositions are listed out in weight %.

Example 1 and Comparative Example 2

Purpose—The purpose of these examples was five-fold. Firstly, these examples show that useful molding compositions can be made from the PET derived PBT. The properties of these compositions are comparable to that of virgin PBT derived from dimethyl terephthalate. Secondly, these examples also demonstrated that formulations including epoxy resin and PET derived PBT are comparable to those of formulations including epoxy resin and virgin PBT derived from dimethyl terephthalate. Thirdly, these examples will demonstrate that properties of compositions containing epoxy resin and PET derived PBT are comparable to those formulations including epoxy resin and virgin PBT derived from dimethyl terephthalate when hydrolytically aged for various time periods. Fourth, these examples consumed less amount of energy to produce versus DMT based PBT. This energy refers to the non-renewable energy that is utilized in making the molding composition. It involves doing a cradle to grave energy analysis on all components of the system and calculating the total energy required to make them. In all the examples shown, this difference in energy results only due to the use of PET derived PBT versus DMT based PBT. All other ingredients remain the same and hence their energy contribution in the overall composition can be neglected. Fifth, these examples will demonstrate that properties of compositions containing epoxy resin and PET derived PBT are comparable to those formulations including epoxy resin and virgin PBT when hydrolytically aged.

The compositions of examples 1 and 2 are as shown in Table 3.

TABLE 3

'PET derived PBT' Composition with various additives and comparative.

| Component | unit | 1 | 2 (comparative) |
|---|---|---|---|
| GE PBT 315 (1.2 iv) | % |  | 40 |
| PET Derived PBT (1.2 iv) | % | 40 |  |
| GE PBT 195 (0.65 iv) |  |  | 49.65 |
| PET Derived PBT (0.65 iv) |  | 49.65 |  |
| NaSt | % | 0.05 | 0.05 |
| Hindered Phenol Stablizer | % | 0.2 | 0.2 |
| Acrylic Polymer IM Pellets | % | 8 | 8 |
| ERL4221 | % | 1.5 | 1.5 |
| SEENOX 412S | % | 0.2 | 0.2 |
| PETS | % | 0.2 | 0.2 |
| Irgaphos 168 |  | 0.2 | 0.2 |

The properties of the molding compositions shown in Table 3 were tabulated below in Tables 4.

TABLE 4

Physical Property Data for Example 1 and Comparative Example 2.

| Test | Unit | 1 | 2 (comparative) |
|---|---|---|---|
| Flexural Modulus; 1.27 mm/min; (ASTM) | MPa | 2060 | 2210 |
| Flexural Modulus; ISO | MPa | 1965 | 2116.4 |
| Deflection temp, 1.82 Mpa; ASTM | ° C. | 45 | 47 |
| Deflection temp, Flat, 1.8 Mpa; ISO | ° C. | 45 | 47 |
| Tensile Modulus; 50 mm/min; ASTM | MPa | 2120 | 2220 |
| Tensile Stress at Yield; ASTM | MPa | 48 | 50 |
| Tensile Stress at Break; ASTM | MPa | 22 | 25 |
| Tensile Elongation at Yield; ASTM | % | 3.7 | 3.7 |
| Tensile Elongation at Break; ASTM | % | 66 | 125 |
| Tensile Modulus; ISO | MPa | 2036 | 1539 |
| Tensile Stress at Yield; ISO | MPa | 48 | 48 |
| Tensile Stress at Break; ISO | MPa | 33 | 25 |
| Tensile Strain at Yield; ISO | % | 3.3 | 3.4 |
| Tensile Strain at Break; ISO | % | 36 | 69 |
| Notched IZOD Impact Strength; ISO; @ 25 C. | kJ/m2 | 8 | 11 |
| Notched IZOD Impact Strength; ASTM; @ 25 C. | J/m | 70 | 92 |
| Multiaxial Impact Total Energy, 2.3 m/s, @ 25 C.; ASTM | J | 46 | 54 |
| Charpy Impact strength, 25 C. | kJ/m2 | 10 | 12 |
| Density - ISO | g/cm$^3$ | 1.28 | 1.28 |
| Mold Shrinkage Parallel; GE Method | % | 2.3 | 2.3 |
| Mold Shrinkage; Perpendicular; GE Method | % | 2.2 | 2.3 |
| MVR, 250 C., 2.16 Kg, 240 s | cm$^3$/10 min | 47.8 | 22.2 |
| MFR, 250 C., 2.16 Kg, 360 s | g/10 min | 54.9 | 24.6 |
| Vicat Softening Temp, 50 N, 120 C./hr; ISO | ° C. | 206 | 215 |
| Coefficient Linear Thermal Expansion, Flow Direction; ISO | um/(m-° C.) | 91 | 88 |
| Coefficient Linear Thermal Expansion, cross Flow direction; ISO | um/(m-° C.) | 92 | 91 |
| Melt Viscosity Rate @ 250 C., 2.16 Kg, 240 s; ISO | cm3/10 min | 48 | 22 |
| Melt Flow Rate @ 250 C., 2.16 Kg, 360 S; ASTM | g/10 min | 55 | 25 |

The properties and percent retention calculations upon hydro aging of the molding compositions shown in Table 3 are tabulated below in Table 5.

TABLE 5

Example 1 and 2 Hydro Aging Data Before and After Hydro Aging for various time periods.

| | Tensile Modulus Mpa | | Stress @ Yield Mpa | | Elongation @ Break % | |
|---|---|---|---|---|---|---|
| | 1 | 2 (comparative) | 1 | 2 (comparative) | 1 | 2 (comparative) |
| No Aging | 2120 | 2220 | 47.9 | 49.9 | 65.8 | 124.5 |
| % Retention | | −4.5045045 | | −4.008016 | | −47.148594 |
| 1 day | 1850 | 2120 | 44.6 | 46.9 | 36 | 43.7 |
| % Retention | | −12.735849 | | −4.9040512 | | −17.620137 |
| 3 days | 2040 | 2200 | 45.6 | 47.8 | 33.7 | 28.6 |
| % Retention | | −7.2727273 | | −4.6025105 | | 17.832168 |
| 7 days | 2190 | 2220 | 45.6 | 47.3 | 30.4 | 23.1 |

TABLE 5-continued

Example 1 and 2 Hydro Aging Data Before and After Hydro Aging for various time periods.

| | Tensile Modulus Mpa | | Stress @ Yield Mpa | | Elongation @ Break % | |
|---|---|---|---|---|---|---|
| | 1 | 2 (comparative) | 1 | 2 (comparative) | 1 | 2 (comparative) |
| % Retention | | −1.3513514 | | −3.5940803 | | 31.601732 |
| 14 days | 2140 | 2260 | 41.8 | 48.1 | 2.8 | 22.2 |
| % Retention | | −5.3097345 | | −13.097713 | | −87.387387 |

The comparison between Example 1 and Example 2 showed that comparable properties of the molding composition can be obtained with the PET derived PBT. The notched izod for the cases can be considered equal within limits of experimental error for this test. The same is true for the tensile elongation @ break values. The heat deflection temperature (HDT) of the composition with 'PET derived PBT' was 2° C. lower than that with virgin PBT derived from DMT. The MVR of the composition used in Example 1, however, was significantly higher than the composition used in Comparative Example 2.

The comparison between Example 1 and Example 2 regarding hydro aging at various temperatures show comparable properties of the molding composition can be obtained with the PET derived PBT when aged. With regard to tensile modulus and stress at yield, the largest drop in percentage when incorporating PET derived PBT was 13%. The decrease was not substantial with respect to this data set and does not reflect a statistical difference between Example 1 and the Comparative Example 2. Therefore, the tensile modulus and tensile stress at yield values for Example 1 and Comparative Example 2 can be considered equal data sets when hydrolytically aged under said conditions. The increase in percentage drop when using PET derived PBT with regard to the tensile elongation at break measurement is due to experimental error for this test as well as due to lower numerical values involved in these percentage calculations. The tensile elongation at break can be considered equal within limits of experimental error. However, with respect to MVR, the composition of Example 1 was significantly better than the composition used in Comparative Example 2.

Example 1 consumed less energy by approximately 27 MJ/kg molding composition versus the comparative example. Thus, Example 1 was a more energy efficient molding composition than Example 2.

Example 3 and Comparative Example 4

Purpose—The purpose of these examples is three fold. Firstly, these examples show that useful molding compositions can be made from the PET derived PBT. The properties of these compositions were comparable to that of virgin PBT derived from dimethyl terephthalate. Secondly, these examples also demonstrate that formulations including epoxy resin and PET derived PBT are comparable to those of formulations including epoxy resin and virgin PBT derived from DMT. Thirdly, these examples consumed less amount of energy to produce versus DMT based PBT. This energy refers to the non-renewable energy that is utilized in making the molding composition. It involves doing a cradle to grave energy analysis on all components of the system and calculating the total energy required to make them. In all the examples shown, this difference in energy results only due to the use of PET derived PBT versus DMT based PBT. All other ingredients remain the same and hence their energy contribution in the overall composition can be neglected.

The compositions of examples 3 and 4 are as shown in Table 6.

TABLE 6

'PET derived PBT' Composition with various additives and comparative.

| Component | unit | 3 | 4 (comparative) |
|---|---|---|---|
| GE PBT 315 (1.2 iv) | % | | 21.87 |
| PET Derived PBT (1.2 iv) | % | 21.87 | |
| GE PBT 195 (0.65 iv) | | | 21.82 |
| PET Derived PBT (0.65 iv) | | 21.82 | |
| NaSt | % | 0.1 | 0.1 |
| PETS | % | 0.1 | 0.1 |
| Brominate Epoxy | | 15 | 15 |
| Glass Fiber | | 30 | 30 |
| Sb2O3/PE 80/20 | | 5 | 5 |
| Irgaphos 168 | | 0.05 | 0.05 |
| Lotader AX8900 | | 3 | 3 |
| Antioxidant 60 | | 0.06 | 0.06 |
| Hytrel 4056 | | 3 | 3 |

The properties of the molding compositions shown in Table 6 are tabulated below in Table 7.

TABLE 7

Physical Property Data for Example 3 and Comparative Example 4.

| Test | Conditions | Units | 3 | 4 (comparative) |
|---|---|---|---|---|
| Notched Izod - ASTM | 2 lb | kgf/cm2 | 11.6 | 11.4 |
| Tensile Strength - ASTM | 10 mm/min | kgf/cm2 | 1230 | 1243.3 |
| Tensile Elongation @ Break - ASTM | 10 mm/min | % | 8.7 | 8.2 |
| Flexural Strength- ASTM | 2.5 mm/min, 100 mm | kgf/cm2 | 1778.5 | 1856.2 |
| Flexural Modulus - ASTM | 2.5 mm/min, 100 mm | kgf/cm2 | 82777.5 | 82845 |

TABLE 7-continued

Physical Property Data for Example 3 and Comparative Example 4.

| Test | Conditions | Units | 3 | 4 (comparative |
|---|---|---|---|---|
| Heat Deflection Temperature - ASTM | 18.6 kg | C. | 196.7 | 200.4 |
| Melt Flow Index - ASTM | 250 C./5 kg | g/10 min | 39 | 20.3 |
| ASH - ASTM | | | 30.3 | 30.2 |
| Specific Gravity - ASTM | | | 1.6 | 1.6 |
| Shrinkage | 50 C., 2.0 mm, flow | % | 0.11 | 0.13 |
| Shrinkage | 50 C., 2.0 mm, xflow | % | 0.55-0.65 | 0.59-0.69 |
| Shrinkage | 80 C., 2.0 mm, flow | % | 0.12 | 0.14 |
| Shrinkage | 80 C., 2.0 mm, xflow | % | 0.71-0.80 | 0.74-0.84 |
| Charpy - ISO | 2 J | kJ/m2 | 10.62 | 11.7 |
| Tensile Strength - ISO | 5 mm/min | MPa | 121.35 | 125.3 |
| Tensile Elongation @ Break - ISO | 5 mm/min | % | 3 | 3.85 |
| Tensile Modulus - ISO | 1 mm/min | MPa | 8580.4 | 5253.6 |
| Flexural Strenght - ISO | 2 mm/min, 64 mm | MPa | 186.07 | 187.9 |
| Flexural Modulus - ISO | 2 mm/min, 64 mm | MPa | 8742.4 | 8971.6 |
| Heat Deflection Temperature - ISO | 18.6 kg/64 mm | C. | 189.82 | 193.45 |

The comparison between example 3 and 4 showed that comparable properties of the molding composition can be obtained with the PET derived PBT. The tensile modulus for the cases can be considered equal within limits of experimental error for this test. The heat deflection temperature (HDT) of the composition with 'PET derived PBT' was 4° C. lower than that with virgin PBT.

Example 3 consumed less energy by approximately 13.3 MJ/kg molding composition versus the comparative example. Thus, Example 3 was a more energy efficient molding composition than 4.

Example 5 and Comparative Example 6

Purpose—The purpose of these examples was three fold. Firstly, these examples show that useful molding compositions can be made from the PET derived PBT. The properties of these compositions were comparable to that of virgin PBT derived from dimethyl terephthalate. Secondly, these examples also demonstrate that formulations including epoxy resin and PET derived PBT are comparable to those of formulations including epoxy resin and virgin PBT derived from DMT. Thirdly, these examples consumed less amount of energy to produce versus DMT based PBT. This energy refers to the non-renewable energy that is utilized in making the molding composition. It involves doing a cradle to grave energy analysis on all components of the system and calculating the total energy required to make them. In all the examples shown, this difference in energy results only due to the use of PET derived PBT versus DMT based PBT. All other ingredients remain the same and hence their energy contribution in the overall composition can be neglected.

The compositions of examples 5 and 6 are as shown in Table 8.

TABLE 8

'PET derived PBT' Composition with various additives and comparative.

| Component | unit | 5 | 6 (comparative) |
|---|---|---|---|
| GE PBT 315 (1.2 iv) | % | | 54.27 |
| PET Derived PBT (1.2 iv) | % | 54.27 | |
| | | | 44.4 |
| PET Derived PBT (0.65 iv) | | 44.4 | |
| NaSt | % | 0.07 | 0.07 |
| Hindered Phenol Stablizer | % | 0.06 | 0.06 |
| ERL4221 | % | 1.1 | 1.1 |
| PETS | % | 0.1 | 0.1 |

The properties of the molding compositions shown in Table 8 are tabulated below in Table 9.

TABLE 9

Physical Property Data for Example 5 and Comparative Example 6.

| | | | 5 | 6 (comparative) |
|---|---|---|---|---|
| HDT-ASTM-GLB-MTV | Deflection temp, 1.82 MPa (ASTM) | ° C. | 47.9 | 50.9 |
| HDT-ISO-GLB-MTV | Deflection temp, Flat, 1.8 MPa (ISO) | ° C. | 46 | 48.15 |
| HDT-ISO-GLB-MTV | Deflection temp, 0.456 MPa (ISO) | ° C. | 128.95 | 133.05 |
| TENS-ASTM-GLB-FI-MTV | Tensile Modulus (ASTM) | MPa | 2830 | 2920 |
| TENS-ASTM-GLB-FI-MTV | Tensile Stress at Yield (ASTM) | MPa | 58 | 59.1 |
| TENS-ASTM-GLB-FI-MTV | Tensile Stress at Break (ASTM) | MPa | 37.7 | 23.2 |
| TENS-ASTM-GLB-FI-MTV | Tensile Elongation at Yield (ASTM) | % | 3.4 | 3.3 |
| TENS-ASTM-GLB-FI-MTV | Tensile Elongation at Break (ASTM) | % | 212.8 | 101.5 |
| TENS-ISO-GLB-FIL-MTV | Tensile Modulus (ISO) | MPa | 2507.6 | 2827.6 |
| TENS-ISO-GLB-FIL-MTV | Tensile Stress at Yield (ISO) | MPa | 55.96 | 56.54 |

TABLE 9-continued

Physical Property Data for Example 5 and Comparative Example 6.

| | | | 5 | 6 (comparative) |
|---|---|---|---|---|
| TENS-ISO-GLB-FIL-MTV | Tensile Stress at Break (ISO) | MPa | 55.6 | 53.46 |
| TENS-ISO-GLB-FIL-MTV | Tensile Strain at Yield (ISO) | % | 3.1 | 2.94 |
| TENS-ISO-GLB-FIL-MTV | Tensile Strain at Break (ISO) | % | 3.63 | 13.96 |
| IZOD-ASTM-GLB-MTV | Notched IZOD Impact Strength (ASTM), −40, 2 LBF/FT | J/m | 30.1 | 36.8 |
| IZOD-ASTM-GLB-MTV | Notched IZOD Impact Strength (ASTM), −30, 2 LBF/FT | J/m | 30.1 | 38.9 |
| MVR-ISO-GLB-MTV | MVR, 250 C., 5 Kg, 240 s (ISO) | $cm^3$/10 min | 127.5 | 52 |
| MVR-ASTM-GLB-MTV | MVR, 250 C., 5 Kg, 360 s (ASTM) | $cm^3$/10 min | 137 | 54.8 |
| MV_M-ISO-GLB-MTV | App. Viscosity @ 644.50 App shear rate @ 1/s; 250 C. | Pa-s | 145.1 | 300 |

The comparison between example 5 and 6 show that comparable properties of the molding composition can be obtained with the PET derived PBT. The tensile modulus for the cases can be considered equal within limits of experimental error for this test. The same is true for the tensile elongation @ break values. The heat deflection temperature (HDT) of the composition with 'PET derived PBT' was 2-4° C. lower than that with virgin PBT.

Examples 5 consumed less energy by approximately 30 MJ/kg molding composition versus the comparative example. Thus, Example 5 was a more energy efficient molding composition than 6.

Example 7 and Comparative Example 8

The purpose of these examples was three fold. Firstly, these examples show that useful molding compositions can be made from the PET derived PBT. The properties of these compositions were comparable to that of virgin PBT derived from dimethyl terephthalate. Secondly, these examples also demonstrate that formulations including epoxy resin and PET derived PBT are comparable to those of formulations including epoxy resin and virgin PBT derived from DMT. Thirdly, these examples consumed less amount of energy to produce versus DMT based PBT. This energy refers to the non-renewable energy that is utilized in making the molding composition. It involves doing a cradle to grave energy analysis on all components of the system and calculating the total energy required to make them. In all the examples shown, this difference in energy results only due to the use of PET derived PBT versus DMT based PBT. All other ingredients remained the same and hence their energy contribution in the overall composition can be neglected.

The compositions of examples 7 and 8 are as shown in Table 10.

TABLE 10

'PET derived PBT' Composition with various additives and comparative.

| Component | unit | 7 | 8 (comparative) |
|---|---|---|---|
| GE PBT 315 (1.2 iv) | % | | 28.6579 |
| PET Derived PBT (1.2 iv) | % | 28.6579 | |
| Hindered Phenol Stablizer | % | 0.08 | 0.08 |
| ERL4221 | % | 0.05 | 0.05 |
| SEENOX 412S | % | 0.4 | 0.4 |
| Irgaphos 168 | | 0.3 | 0.3 |
| Lexan 4701R | | 14 | 14 |
| PC100 | | 6.29 | 6.29 |
| Lexan ML8199-111N | | 34.6321 | 34.6321 |
| Phosphorous Acid 45% | | 0.05 | 0.05 |
| UVA 234 | | 0.54 | 0.54 |
| PC 80%/EMA-GMA 20% CONCENTRATE | | 15 | 15 |

The properties of the molding compositions shown in Table 10 are tabulated below in Table 11.

TABLE 11

Physical Property Data for Example 7 and Comparative Example 8.

| | Test | Units | 7 | 8 (comparative) |
|---|---|---|---|---|
| HDT-ASTM-GLB-MTV | Heat Deflection temp, 1.82 MPa (ASTM) | ° C. | 82 | 86.5 |
| HDT-ISO-GLB-MTV | Heat Deflection temp, Flat, 1.8 MPa (ISO) | ° C. | 79.15 | 82 |
| HDT-ASTM-GLB-MTV | Heat Deflection temp, 0.455 MPa (ASTM) | ° C. | 95.9 | 104 |
| HDT-ISO-GLB-MTV | Heat Deflection temp, 0.456 MPa (ISO) | ° C. | 92.55 | 102.1 |
| TENS-ASTM-GLB-FI-MTV | Tensile Modulus (ASTM) | MPa | 2420 | 2400 |
| TENS-ASTM-GLB-FI-MTV | Tensile Stress at Yield (ASTM) | MPa | 62.1 | 59.1 |
| TENS-ASTM-GLB-FI-MTV | Tensile Stress at Break (ASTM) | MPa | 43.6 | 58.9 |

TABLE 11-continued

Physical Property Data for Example 7 and Comparative Example 8.

| | Test | Units | 7 | 8 (comparative) |
|---|---|---|---|---|
| TENS-ASTM-GLB-FI-MTV | Tensile Elongation at Yield (ASTM) | % | 4.4 | 4.5 |
| TENS-ISO-GLB-FIL-MTV | Tensile Modulus (ISO) | MPa | 2465.8 | 2556.2 |
| TENS-ISO-GLB-FIL-MTV | Tensile Stress at Yield (ISO) | MPa | 59.72 | 59.92 |
| TENS-ISO-GLB-FIL-MTV | Tensile Stress at Break (ISO) | MPa | 52.6 | 57.84 |
| TENS-ISO-GLB-FIL-MTV | Tensile Strain at Yield (ISO) | % | 3.96 | 4.18 |
| TENS-ISO-GLB-FIL-MTV | Tensile Strain at Break (ISO) | % | 122.42 | 128.52 |
| IZOD-ASTM-GLB-MTV | Notched IZOD Impact Strength (ASTM), −40, 2 LBF/FT | J/m | 94.5 | 97.5 |
| IZOD-ASTM-GLB-MTV | Notched IZOD Impact Strength (ASTM), −30, 2 LBF/FT | J/m | 89.5 | 98.7 |
| IZOD-ISO-GLB-MTV | Notched IZOD Impact Strength (ISO), −40, 5.5 J | kJ/m2 | 5.27 | 9.05 |
| IZOD-ISO-GLB-MTV | Notched IZOD Impact Strength (ISO), −30, 5.5 J | kJ/m2 | 7.26 | 10.07 |
| MVR-ISO-GLB-MTV | MVR, 250 C., 5 Kg, 240 s (ISO) | cm$^3$/10 min | 13 | 12.5 |
| MVR-ASTM-GLB-MTV | MVR, 250 C., 5 Kg, 360 s (ASTM) | cm$^3$/10 min | 13.8 | 12.2 |
| MV_M-ISO-GLB-MTV | App. Viscosity @ 644.50 App shear rate @ 1/s; 250 C. | Pa-s | 755.3 | 787.9 |

The comparison between example 7 and 8 show that comparable properties of the molding composition can be obtained with the PET derived PBT. The heat deflection temperature (HDT) of the composition with 'PET derived PBT' was 3-9° C. lower than that with virgin PBT. Examples 7 consumed less energy by approximately 8.7 MJ/kg molding composition versus the comparative example. Thus, the composition of Example 7 was a more energy efficient molding composition than the composition used in Example 8.

Examples 9-13

The purpose of these experiments were to produce a PET derived PBT copolymer with different amounts of comonomer loadings. It is known that the materials having a melting point greater than 200° C. exhibit useful engineering thermoplastic type properties. Thus, all the examples below show that useful PET derived PBT copolymers (melting point greater than 200° C.) can be synthesized. The process to produce these materials is shown below. Examples 9-13 show different PET-derived PBT resins that were used in the compositions of Examples 14-18. Table 12 lists the raw materials that were used to synthesize the PET-derived PBT.

TABLE 12

Raw material amount details used for Examples 9-13 (PET derived PBT)

| Item | Parameter | Unit | 9 | 10 | 11 | 12 | 13 |
|---|---|---|---|---|---|---|---|
| Raws | Polyester Type | | Recycled PET | Recycled PET | Recycled PET | Recycled PET | Recycled PET |
| | PET Weight | Kgs | 11.4 | 11.4 | 11.4 | 11.6 | 11.6 |
| | BDO Weight | Kgs | 15.9 | 16.8 | 16.8 | 16.8 | 16.8 |
| | IPA Weight | Kgs | 0.0 | 0.0 | 0.0 | 0.52 | 1.04 |
| | DEG Weight | Kgs | 0.0 | 0.31 | 0.63 | 0.0 | 0.0 |
| | TPT as Ti Element | ppm | 59 | 56 | 56.5 | 52.5 | 50.1 |

Preparation Process for Making PET-Derived PBT
Pilot Plant Process (BDO:PET=2.9:1)

A modified polybutylene random copolymer was derived from a polyethylene terephthalate component at larger scale in a helicone reactor. The helicone reactor had a capacity of 40 liters and was equipped with a special design of twin opposing helical blades with 270 degree twist; constructed of 316 SS with 16 g polish finish. The blade speed could be varied from 1 to 65 rpm. The agitators were connected to a 7.5 HP Constant Torque Inverter Duty Motor which operates at 230/460 VAC, 3 PH and 60 Hz. These agitators provided excellent surface area for the polymer melt in order to build molecular weight. The helicone was also designed with an overhead condenser to condense the vapors in the glycolysis, transesterification (if any) and polymerization stages.

25 lbs (11.4 kgs) of recycle PET pellets with 35 lbs (15.9 kgs) of butanediol (molar ratio 2.9:1) were charged to the helicone reactor. 4.6 ml (100 ppm as Ti) of TPT catalyst were also added to the reaction mix. The temperature of the heating oil (for the helicone) was set to 250 C. The agitator speed was set at 67% of maximum. The butanediol was refluxed into the reactor for 2 hours. It should be noted that the design of the overhead condenser system did not allow a complete reflux of the butanediol. As a result, about 5 lbs (2.3 kgs) to 10 lbs (4.5 kgs) of butanediol evolved in the initial stages could not be refluxed. The butanediol evolved after that could be completely refluxed into the reactor.

For the polymerization stage (also referred to in this draft as 'poly stage'), a vacuum was applied to the helicone reactor and the reflux of butanediol to the reactor was discontinued. The speed of the agitator was set to 60% of max and the target amps of the motor were 3.5 amps. The logic for changes in agitator speed as the molecular weight of the polymer built up is shown in Table 3. The system pressure was brought down to 0.5 Torr (0.066 kPa) by the vacuum blower. The reaction was carried out until the polymer mass reached its $3^{rd}$ build. The reaction was stopped after 15 minutes into the $3^{rd}$ build and the polymer was cast in blobs. The products were then allowed to dry and ground into pellets.

Analysis/Results

The following tests were conducted on the polymer sample: iv measurement, NMR analysis and DSC analysis.

TABLE 13

Differential scanning calorimetry (DSC), Intrinsic viscosity (IV) and composition data by NMR of the Examples 9-13

| Item | Parameter | Unit | Example 9 | Example 10 | Example 11 | Example 12 | Example 13 |
|---|---|---|---|---|---|---|---|
| DSC Data | Melting Point | (° C.) | 220.11 | 216.3 | 218.1 | 210.93 | 203.09 |
| | Crystallization Temp | (° C.) | 163.44 | 150.1 | 159.4 | 149.91 | 139.68 |
| | DH fusion | (° C.) | 26.41 | 27.1 | 26.5 | 24.79 | 23.65 |
| | DH crystallization | (kJ/kg) | 41.60 | 39.9 | 37.7 | 38.73 | 33.36 |
| Intrinsic Viscosity | IV | Dl/g | | 1.1 | 1.1 | 1.1 | 1.2 |
| Composition by NMR analysis | EG Repeat Unit | mol % | 1.7 | 3.0 | 3.2 | 2.8 | 2.9 |
| | DEG Repeat Unit | mol % | .2 | 0.4 | 0.3 | .2 | .2 |
| | BDO Repeat Unit | mol % | 47.9 | 47.4 | 47.3 | 47.5 | 47.4 |
| | Isophthalic Repeat Unit | mol % | 1.1 | 1.0 | 1.0 | 3.4 | 5.5 |
| | Terephthalic Repeat Unit | mol % | 49.0 | 48.1 | 48.1 | 46.2 | 44.1 |
| | Total Comonomers | mol % | 3.0 | 4.4 | 4.5 | 6.4 | 8.6 |
| | Total Comonomers | ** | 6.0 | 8.8 | 9.0 | 12.8 | 17.2 |

** Residual Equivalents relative to the total of 100 equivalents of diol and 100 equivalents of diacid groups ((isophthalic acid groups + DEG groups + EG groups) × 2)

Examples 14-18

In these Examples, compositions containing the PET-derived PBT of Examples 9-13 were made and evaluated, as indicated below.

The compositions of Examples 14-18 were synthesized using resins from Examples 9-13 respectively. The formulation for Examples 14-18 is shown below in Table 14.

TABLE 14

Compositions for Examples 14-18

| Component | Unit | Example 14 | Example 15 | Example 16 | Example 17 | Example 18 |
|---|---|---|---|---|---|---|
| PET Derived PBT(with different comonomer contents) | % | 43.69 | 43.69 | 43.69 | 43.69 | 43.69 |
| Low Density Polyethylene | % | 1.0 | 1.0 | 1.0 | 1.0 | 1.0 |
| Glass Fiber | % | 30.0 | 30.0 | 30.0 | 30.0 | 30.0 |
| Brominated Epoxy | % | 16.0 | 16.0 | 16.0 | 16.0 | 16.0 |
| IRGAPHOS 168 | % | 0.05 | 0.05 | 0.05 | 0.05 | 0.05 |
| PETS | % | 0.10 | 0.10 | 0.10 | 0.10 | 0.10 |
| NaST | % | 0.10 | 0.10 | 0.10 | 0.10 | 0.10 |

TABLE 14-continued

Compositions for Examples 14-18

| Component | Unit | Example 14 | Example 15 | Example 16 | Example 17 | Example 18 |
|---|---|---|---|---|---|---|
| Lotader AX8900 | % | 3.0 | 3.0 | 3.0 | 3.0 | 3.0 |
| Antioxidant 60 | % | 0.06 | 0.06 | 0.06 | 0.06 | 0.06 |
| Hytrel 4056 as F121 | % | 3.0 | 3.0 | 3.0 | 3.0 | 3.0 |

The properties of the molding compositions shown in Table 14 are tabulated below in Table 15.

TABLE 15

Physical Property data for Examples 14-18

| Test | Unit | Example 14 | Example 15 | Example 16 | Example 17 | Example 18 |
|---|---|---|---|---|---|---|
| Heat Deflection temp, 0.455 Mpa (ASTM) | ° C. | 203.1 | 197.9 | 201.6 | 192.1 | 183.4 |
| Heat Deflection temp, 1.82 Mpa (ASTM) | ° C. | 175.5 | 161.5 | 177 | 158.2 | 149.8 |
| Tensile Modulus (ASTM) | MPa | 10600 | 10400 | 10500 | 10100 | 10700 |
| Tensile Stress at Yield (ASTM) | MPa | 108 | 101 | 107 | 104 | 104 |
| Tensile Stress at Break (ASTM) | MPa | 108 | 101 | 107 | 104 | 104 |
| Tensile Elongation at Yield (ASTM) | % | 2.6 | 2.7 | 2.7 | 2.8 | 2.7 |
| Tensile Elongation at Break (ASTM) | % | 2.9 | 3.1 | 2.9 | 3.3 | 3.3 |
| Unnotched IZOD Impact Strength (ASTM), at 23° C. | J/m | 890 | 873 | 907 | 899 | 913 |
| Flex Modulus (ASTM) | MPa | 8090 | 7740 | 8170 | 7840 | 7960 |
| Flex Stress @ 5% Strain (ASTM) | MPa | 174 | 167 | 177 | 172 | 174 |
| Flex Stress @ Yield (ASTM) | MPa | 174 | 167 | 177 | 172 | 174 |
| MVR, 250 C, 5 Kg, 360 s (ASTM) | cm$^3$/10 min | .549 | .792 | 2.61 | 2.42 | 158 |
| EG Repeat Unit | mol % | 1.7 | 3.0 | 3.2 | 2.8 | 2.9 |
| DEG Repeat Unit | mol % | .2 | 0.4 | 0.3 | .2 | .2 |
| BDO Repeat Unit | mol % | 47.9 | 47.4 | 47.3 | 47.5 | 47.4 |
| Isophthalic Repeat Unit | mol % | 1.1 | 1.0 | 1.0 | 3.4 | 5.5 |
| Terephthalic Repeat Unit | mol % | 49.0 | 48.1 | 48.1 | 46.2 | 44.1 |
| Total Comonomers | Mol % | 3.0 | 4.4 | 4.5 | 6.4 | 8.6 |
| Total Comonomers Equivalents | ** | 6.0 | 8.8 | 9.0 | 12.9 | 17.2 |

**Residual Equivalents relative to the total of 100 equivalents of diol and 100 equivalents of diacid groups ((isophthalic acid groups + DEG groups + EG groups) × 2)

It is known for commercial reasons, molding compositions having HDT (at 0.455 MPa) greater than 180° C. are useful. A molding composition as shown in Example 18 was made using PET derived PBT having a total comonomer content at 17.2 equivalents of a residue selected from the group of isophthalic acid groups, ethylene glycol groups, and diethylene glycol groups, and combinations thereof, relative to the total of 100 equivalents of diol and 100 equivalents of diacid groups in the modified polybutylene terepthalate random copolymer. The HDT (at 0.455 MPa) value for this composition was observed to be 183.4° C. It is also interesting to note that the tensile modulus for all examples shown in Table 15 have approximately the same value. This proves that having a higher comonomer content in the PET derived PBT has minimal impact on tensile modulus of the molding compositions. As such, the results show that a molding composition containing PET-derived PBT having useful properties can be made despite having a total comonomer of up to 17.2 equivalents, as indicated above. Although the present invention has been described in detail with reference to certain preferred versions thereof, other variations are possible. Therefore, the spirit and scope of the appended claims should not be limited to the description of the versions contained therein.

What is claimed is:

1. A molding composition comprising:
   (a) from 20 to 49.9 wt % of a first polyester component having an intrinsic viscosity ranging from 0.5 to 1.0 and comprising: a first polybutylene terephthalate random copolymer that (1) is derived from polyethylene terephthalate component selected from the group consisting of polyethylene terephthalate and polyethylene terephthalate copolymers and (2) has at least one residue derived from the polyethylene terephthalate component, and
   (b) from 20 to 49.9 wt % of a second polyester component having an intrinsic viscosity ranging from 1.1 to 1.4 and comprising: a second polybutylene terephthalate random copolymer that (1) is derived from polyethylene terephthalate component selected from the group consisting of polyethylene terephthalate and polyethylene terephthalate copolymers and (2) has at least one residue derived from the polyethylene terephthalate component, and
   (c) from 0.01 to 20 wt. % of a carboxy reactive component; wherein the first polyester component, the second polyester component, and optionally at least one additive, are present in a total amount of 100 wt %.

2. The molding composition of claim 1 wherein, in the first and/or second polybutylene terephthalate random copolymer, the residue derived from the polyethylene terephthalate component is selected from the group consisting of ethylene glycol groups, diethylene glycol groups, isophthalic acid groups, antimony-containing compounds, germanium-containing compounds, titanium-containing compounds, cobalt-containing compounds, tin-containing compounds, aluminum, aluminum salts, 1,3-cyclohexanedimethanol isomers, 1,4-cyclohexanedimethanol isomers, alkaline salts, alkaline earth metal salts, phosphorous-containing compounds and anions, sulfur-containing compounds and anions, naphthalene dicarboxylic acids, 1,3-propanediol groups, and combinations thereof.

3. The molding composition of claim 1 wherein, in the first and/or second polybutylene terephthalate random copolymer, the at least one residue derived from the polyethylene terephthalate component comprises mixtures of ethylene glycol and diethylene glycol groups.

4. The molding composition of claim 3 wherein, in the first and/or second polybutylene terephthalate random copolymer, the residue derived from the polyethylene terephthalate component further comprises isophthalic acid groups.

5. The molding composition of claim 3 wherein, in the first and/or second polybutylene terephthalate random copolymer, the residue derived from the polyethylene terephthalate component further comprises groups selected from the group consisting of a cis isomer of 1,3-cyclohexanedimethanol, cis isomer of 1,4-cyclohexanedimethanol, trans isomer of 1,3-cyclohexanedimethanol, trans isomer of 1,4-cyclohexanedimethanol, and combinations thereof.

6. The molding composition of claim 1 wherein, in the first and/or second polybutylene terephthalate random copolymer, the residue derived from the polyethylene terephthalate component comprises groups selected from the group consisting of a cis isomer of 1,3-cyclohexanedimethanol, cis isomer of 1,4-cyclohexanedimethanol, the trans isomer of 1,3-cyclohexanedimethanol, trans isomer of 1,4-cyclohexanedimethanol, and combinations thereof.

7. The molding composition of claim 1 wherein, in the first and/or second polybutylene terephthalate random copolymer, the residue derived from the polyethylene terepthalate component is selected from the group consisting of ethylene glycol groups, diethylene glycol groups, isophthalic acid groups, a cis isomer of cyclohexanedimethanol, a trans isomer of cyclohexanedimethanol, and combinations thereof.

8. The molding composition of claim 1 wherein, in the first and/or second polybutylene terephthalate random copolymer, the at least one residue derived from the polyethylene terephthalate component comprises ethylene glycol groups, diethylene glycol groups, and cobalt-containing compounds.

9. The molding composition of claim 8 wherein, in the first and/or second polybutylene terephthalate random copolymer, the at least one residue derived from the polyethylene terephthalate component further comprises isophthalic acid groups.

10. The molding composition of claim 1 wherein, in the first and/or second polybutylene terephthalate random copolymer, the residue derived from the polyethylene terephthalate component is selected from the group consisting of ethylene glycol groups, diethylene glycol groups, and cyclohexanedimethanol groups and is in an amount ranging from 0.1 to 10 mole %, based on 100 mole % of glycol in the molding composition.

11. The molding composition of claim 10 wherein, in the first and/or second polybutylene terephthalate random copolymer, the residue derived from the polyethylene terephthalate component further comprises isophthalic acid groups in an amount ranging from 0 to 10 mole %, based on 100 mole % of acid in the polybutylene terephthalate random copolymer.

12. The molding composition of claim 1, wherein the carboxy reactive component is selected from the group consisting of polymeric carboxy reactive materials, non-polymeric carboxy-reactive materials, and combinations thereof.

13. The molding composition of claim 1, wherein the composition further comprises an ultraviolet stabilizer in an amount from 0.05 to 1 wt %.

14. The molding composition of claim 13, wherein the ultraviolet stabilizer is selected from the group consisting of salicylic acid ultraviolet absorbers, benzophenone ultraviolet absorbers, benzotriazole ultraviolet absorbers, cyanoacrylate ultraviolet absorbers, and combinations thereof.

15. The molding composition of claim 1, wherein the composition further comprises a heat stabilizer in an amount from 0.05 to 3 wt %.

16. The molding composition of claim 1, wherein the heat stabilizer is selected from the group consisting of phenol stabilizers, organic thioether stabilizers, organic phosphite stabilizers, hindered amine stabilizers, epoxy stabilizers, and combinations thereof.

17. The molding composition of claim 1, wherein the composition further comprises a mold release agent ranging from 0.05 to 1 wt %.

18. The molding composition of claim 17, wherein the mold release agent is selected from the group consisting of natural paraffins, synthetic paraffins, polyethylene waxes, fluorocarbons, stearic acid, hydroxystearic acid, hydroxy-fatty acids, stearic acid amide, ethylenebisstearamide, alkylenebisfatty acid amides, stearyl alcohol, cetyl alcohol, polyhydric alcohols, polyglycols, polyglycerols; butyl stearate, pentaerythritol tetrastearate, polyhydric alcohol esters of fatty acid, polyglycol esters of fatty acid, silicone oil, functionally equivalent materials of the foregoing, and combinations thereof.

19. The composition of claim 1, wherein the composition further comprises an impact modifier selected from the group consisting of methacrylate butadiene styrene rubbers, acrylate rubbers, acrylonitrile-styrene-acrylate rubbers, high rubber graft acrylonitrile-butadiene-styrenes, acrylate-olefin copolymers and combinations thereof.

20. The composition of claim 19, wherein the impact modifier is present in amount that is at least 1 wt %.

21. The molding composition of claim 1, wherein the first and/or second polybutylene terephthalate random copolymer is derived from 1,4-butanediol that is derived from biomass.

22. The molding composition of claim 1, wherein the composition further comprises a material that increases the heat deflection temperature of the composition by at least 1 to 10° C.

23. The molding composition of claim 22, wherein the material is selected from the group consisting of talcs having fine particles, nanoparticles, polytetrafluoroethylene, clays, mica, and combinations thereof.

24. The molding composition of claim 1, wherein the melt volume rate of the molding composition is higher than the same molding composition made with a monomer-derived polybutylene terephthalate instead of the first and the second first and second polybutylene terephthalate random copolymers.

25. The molding composition of claim 1, wherein the molding composition has a melt volume rate that is at least 10% higher than the same molding composition made with a monomer-derived polybutylene terephthalate instead of the first and second polybutylene terephthalate random copolymers, as measured on pellets according to ISO 1133 method at 250° C. and 5 kgf at dwelling time of 240 seconds and a 2.1 mm orifice.

26. The molding composition of claim 1, wherein the composition has a heat deflection temperature that is at least 180° C., as determined by ASTM D648 at 0.455 MPa.

27. The molding composition of claim 1 wherein, in the first and/or second polybutylene terephthalate random copolymer, the polybutylene terephthalate random copolymer has a total monomer content selected from the group consisting of ethylene glycol, isophthalic acid groups, and diethylene glycol groups in an amount from more than 0 and less than 23 equivalents of a residue selected from the group of isophthalic acid groups, ethylene glycol groups, and diethylene glycol groups, and combinations thereof, relative to the total of 100 equivalents of diol and 100 equivalents of diacid groups in the polybutylene terepthalate random copolymer.

28. The molding composition of claim 1, wherein the composition has a total monomer content selected from the group consisting of ethylene glycol, isophthalic acid groups, and diethylene glycol groups in an amount ranging from more than 0 and less than or equal to 17 equivalents of a residue selected from the group of isophthalic acid groups, ethylene glycol groups, and diethylene glycol groups, and combinations thereof, relative to the total of 100 equivalents of diol and 100 equivalents of diacid groups in the polybutylene terepthalate random copolymer.

29. A method of forming a composition, comprising melt blending the components of the molding composition of claim 1.

30. The method of claim 29, further comprising shaping, extruding, or molding the melt blended composition.

31. The method of claim 29, further comprising molding the melt blended composition.

32. An article comprising the molding composition of claim 1.

33. The article of claim 32, wherein the composition from which the article is molded from has a $CO_2$ reduction index that is at least 0.06 kg.

34. A composition comprising:
   (a) from 20 to 49.9 wt % of a first polyester component having an intrinsic viscosity ranging from 0.5 to 1.0 and comprising: a first polybutylene terephthalate random copolymer that (1) is derived from polyethylene terephthalate component selected from the group consisting of polyethylene terephthalate and polyethylene terephthalate copolymers and (2) has at least one residue derived from the polyethylene terephthalate component, and
   (b) from 20 to 49.9 wt % of a second polyester component having an intrinsic viscosity ranging from 1.1 to 1.4 and comprising: a second polybutylene terephthalate random copolymer that (1) is derived from polyethylene terephthalate component selected from the group consisting of polyethylene terephthalate and polyethylene terephthalate copolymers and (2) has at least one residue derived from the polyethylene terephthalate component, and
   (c) from 0.01 to 20 wt. % of a carboxy reactive component;
   (e) from 0 to 25 wt % of an impact modifier;
   (f) from 0 to 1 wt % of a ultraviolet stabilizer;
   (g) from 0 to 30 wt % of a flame retarding component; and
   (h) from 0 to 1 wt % of a mold release agent;
   wherein the first polyester component, the second polyester component, the carboxy reactive component, the impact modifier, the ultraviolet stabilizer, the flame retarding component, the mold release, and optionally, at least one additive, are present in a total amount of 100 wt %;
   wherein the molding composition has a melt volume rate that is at least 10% higher than the same molding composition made with a monomer-derived polybutylene terephthalate homopolymer instead of the first and second polybutylene terephthalate random copolymers, as measured on pellets according to ISO 1133 method at 250° C. and 5 kgf at dwelling time of 240 seconds and a 2.1 mm orifice;
   wherein the composition has a heat deflection temperature at 0.455 MPa that is greater than 180° C.; and
   wherein the composition has a total monomer content selected from the group consisting of ethylene glycol, isophthalic acid groups, and diethylene glycol groups in an amount ranging from more than 0 and less than or equal to 17 equivalents of a residue selected from the group of isophthalic acid groups, ethylene glycol groups, and diethylene glycol groups, and combinations thereof, relative to the total of 100 equivalents of diol and 100 equivalents of diacid groups in the polybutylene terepthalate random copolymer.

35. The composition of claim 34 wherein, in the first and/or second polybutylene terephthalate random copolymer, the residue derived from the polyethylene terephthalate component is selected from the group consisting of ethylene glycol groups, diethylene glycol groups, isophthalic acid groups, antimony-containing compounds, germanium-containing compounds, titanium-containing compounds, cobalt-containing compounds, tin-containing compounds, aluminum, aluminum salts, 1,3-cyclohexanedimethanol isomers, 1,4-cyclohexanedimethanol isomers, alkaline salts, alkaline earth metal salts, phosphorous-containing compounds and anions, sulfur-containing compounds and anions, naphthalene dicarboxylic acids, 1,3-propanediol groups, and combinations thereof.

36. The composition of claim 34 wherein, in the first and/or second polybutylene terephthalate random copolymer, the at least one residue derived from the polyethylene terephthalate component comprises mixtures of ethylene glycol and diethylene glycol groups.

37. The composition of claim 34 wherein, in the first and/or second polybutylene terephthalate random copolymer, the residue derived from the polyethylene terephthalate component further comprises isophthalic acid groups.

38. The composition of claim 37 wherein, in the first and/or second polybutylene terephthalate random copolymer, the residue derived from the polyethylene terephthalate component further comprises groups selected from the group consisting of a cis isomer of 1,3-cyclohexanedimethanol, cis isomer of 1,4-cyclohexanedimethanol, trans isomer of 1,3-cyclohexanedimethanol, trans isomer of 1,4-cyclohexanedimethanol, and combinations thereof.

39. The composition of claim 34 wherein, in the first and/or second polybutylene terephthalate random copolymer, the residue derived from the polyethylene terephthalate component comprises groups selected from the group consisting of a cis isomer of 1,3-cyclohexanedimethanol, cis isomer of 1,4-cyclohexanedimethanol, the trans isomer of 1,3-cyclohexanedimethanol, trans isomer of 1,4-cyclohexanedimethanol, and combinations thereof.

40. The composition of claim 34 wherein, in the first and/or second polybutylene terephthalate random copolymer, the residue derived from the polyethylene terephthalate component is selected from the group consisting of ethylene glycol groups, diethylene glycol groups, isophthalic acid groups, a cis isomer of cyclohexanedimethanol, a trans isomer of cyclohexanedimethanol, and combinations thereof.

41. The composition of claim 34 wherein, in the first and/or second polybutylene terephthalate random copolymer, the at least one residue derived from the polyethylene terephthalate component comprises ethylene glycol groups, diethylene glycol groups, and cobalt-containing compounds.

42. The composition of claim 41 wherein, in the first and/or second polybutylene terephthalate random copolymer, the at least one residue derived from the polyethylene terephthalate component further comprises isophthalic acid groups.

43. The composition of claim 34 wherein, in the first and/or second polybutylene terephthalate random copolymer, the residue derived from the polyethylene terephthalate component is selected from the group consisting of ethylene glycol groups, diethylene glycol groups, and cyclohexanedimethanol groups and is in an amount ranging from 0.1 to 10 mole %, based on 100 mole % of glycol in the molding composition.

44. The composition of claim 43 wherein, in the first and/or second polybutylene terephthalate random copolymer, the residue derived from the polyethylene terephthalate component further comprises isophthalic acid groups in an amount ranging from 0 to 10 mole %, based on 100 mole % of acid in the polybutylene terephthalate random copolymer.

45. The composition of claim 34, wherein the composition further comprises an ultraviolet stabilizer in an amount from 0.05 to 1 wt %, a heat stabilizer in an amount from 0.05 to 3 wt %, and a mold release agent ranging from 0.05 to 1 wt %.

46. The composition of claim 45, wherein the ultraviolet stabilizer is selected from the group consisting of salicylic acid ultraviolet absorbers, benzophenone ultraviolet absorbers, benzotriazole ultraviolet absorbers, cyanoacrylate ultraviolet absorbers, and combinations thereof; the heat stabilizer is selected from the group consisting of phenol stabilizers, organic thioether stabilizers, organic phosphite stabilizers, hindered amine stabilizers, epoxy stabilizers, and combinations thereof; and the mold release agent is selected from the group consisting of natural paraffins, synthetic paraffins, polyethylene waxes, fluorocarbons, stearic acid, hydroxystearic acid, hydroxyfatty acids, stearic acid amide, ethylenebisstearamide, alkylenebisfatty acid amides, stearyl alcohol, cetyl alcohol, polyhydric alcohols, polyglycols, polyglycerols; butyl stearate, pentaerythritol tetrastearate, polyhydric alcohol esters of fatty acid, polyglycol esters of fatty acid, silicone oil, functionally equivalent materials of the foregoing, and combinations thereof.

47. The composition of claim 34, wherein the composition further comprises an impact modifier selected from the group consisting of methacrylate butadiene styrene rubbers, acrylate rubbers, acrylonitrile-styrene-acrylate rubbers, high rubber graft acrylonitrile-butadiene-styrenes, acrylate-olefin copolymers and combinations thereof.

48. The composition of claim 47, wherein the impact modifier is present in amount that is at least 1 wt %.

49. The composition of claim 34, wherein the first and/or second polybutylene terephthalate random copolymer is derived from 1,4-butanediol that is derived from biomass.

50. The composition of claim 34, wherein the composition further comprises a material that increases the heat deflection temperature of the composition by at least 1 to 10° C.

51. The composition of claim 50, wherein the material is selected from the group consisting of talcs having fine particles, nanoparticles, polytetrafluoroethylene, clays, mica, and combinations thereof.

52. A method of forming a composition, comprising melt blending the components of the composition of claim 34.

53. The method of claim 52, further comprising shaping, extruding, or molding the melt blended composition.

54. The method of claim 53, further comprising molding the melt blended composition.

55. An article comprising the composition of claim 34.

56. The article of claim 55, wherein the composition from which the article is molded from has a $CO_2$ reduction index that is at least 0.06 kg.

* * * * *